United States Patent
Gorokhov

(10) Patent No.: US 8,385,452 B2
(45) Date of Patent: Feb. 26, 2013

(54) METHOD AND APPARATUS FOR SEPARABLE CHANNEL STATE FEEDBACK IN A WIRELESS COMMUNICATION SYSTEM

(75) Inventor: Alexei Y. Gorokhov, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 503 days.

(21) Appl. No.: 12/582,166

(22) Filed: Oct. 20, 2009

(65) Prior Publication Data

US 2010/0104033 A1    Apr. 29, 2010

Related U.S. Application Data

(60) Provisional application No. 61/108,306, filed on Oct. 24, 2008.

(51) Int. Cl.
*H04B 7/02* (2006.01)

(52) U.S. Cl. ........................................................ 375/267

(58) Field of Classification Search ............. 375/259, 375/260, 267; 370/310, 331–334; 455/24, 455/500, 509, 513, 69, 88
See application file for complete search history.

(56) References Cited

U.S. PATENT DOCUMENTS

| 7,944,906 B2 * | 5/2011 | Xu et al. ................... 370/349 |
| 2008/0013610 A1 * | 1/2008 | Varadarajan et al. .......... 375/221 |
| 2008/0165875 A1 * | 7/2008 | Mundarath et al. ........... 375/262 |
| 2008/0192704 A1 | 8/2008 | Kent et al. |
| 2008/0303699 A1 * | 12/2008 | Zhang et al. .................... 341/67 |
| 2010/0091893 A1 * | 4/2010 | Gorokhov ..................... 375/260 |

FOREIGN PATENT DOCUMENTS

WO    WO2008116181 A2    9/2008

OTHER PUBLICATIONS

International Search Report and Written Opinion—PCT/US2009/061854—ISA/EPO—Feb. 25, 2011.

* cited by examiner

*Primary Examiner* — Young T. Tse
(74) *Attorney, Agent, or Firm* — Florin Corie

(57) ABSTRACT

Systems and methodologies are described herein that facilitate the generation and use of separable, hierarchical channel state feedback in a wireless communication system. As described herein, in the event that multiple network nodes cooperate to conduct downlink transmissions to a network user, channel state feedback as reported by the network user can be separated into intra-node feedback relating to per-node channel conditions and inter-node feedback relating to relative phase and/or amplitude between channels corresponding to respective nodes. Further, a network user can select to report intra-node feedback and/or inter-node feedback based on network instructions, a cooperation strategy to be utilized by respective network nodes, or the like. As additionally described herein, respective codebooks on which inter-node and intra-node channel feedback is based can be configured to convey information relating to a partial channel description and/or to vary based on resource units (e.g., sub-bands, resource blocks, etc.) utilized for downlink communication.

62 Claims, 14 Drawing Sheets

METHOD AND APPARATUS FOR SEPARABLE CHANNEL STATE FEEDBACK IN A WIRELESS COMMUNICATION SYSTEM

CROSS-REFERENCE

This application claims the benefit of U.S. Provisional Application Ser. No. 61/108,306, filed Oct. 24, 2008, and entitled "SEPARABLE CHANNEL STATE FEEDBACK FOR WIRELESS COMMUNICATION SYSTEMS," the entirety of which is incorporated herein by reference.

BACKGROUND

I. Field

The present disclosure relates generally to wireless communications, and more specifically to techniques for supporting cooperative communication across network nodes in a wireless communication environment.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded great voice quality, reliable service, and low prices. In addition to mobile telephone networks currently in place, a new class of small base stations has emerged, which can be installed in the home of a user and provide indoor wireless coverage to mobile units using existing broadband Internet connections. Such personal miniature base stations are generally known as access point base stations, or, alternatively, Home Node B (HNB) or Femto cells. Typically, such miniature base stations are connected to the Internet and the network of a mobile operator via a Digital Subscriber Line (DSL) router, cable modem, or the like.

Wireless communication systems can be configured to include a series of wireless access points, which can provide coverage for respective locations within the system. Such a network structure is generally referred to as a cellular network structure, and access points and/or the locations they respectively serve in the network are generally referred to as cells.

Further, in a multiple-in-multiple-out (MIMO) communication system, multiple sources and/or destinations (e.g., corresponding to respective antennas) can be utilized for the transmission and reception of data, control signaling, and/or other information between devices in the communication system. The use of multiple sources and/or destinations for respective transmissions in connection with a MIMO communication system has been shown to yield higher data rates, improved signal quality, and other such benefits over single-input and/or single-output communication systems in some cases. One example of a MIMO communication system is a Network MIMO (N-MIMO) or Coordinated Multipoint (CoMP) system, in which a plurality of network nodes can cooperate to exchange information with one or more receiving devices, such as user equipment units (UEs) or the like. Respective network nodes in a CoMP communication system can coordinate transmissions to one or more users according to various coordination schemes, such as coordinated beamforming (CBF), joint transmission (JT), or the like, based on channel state feedback and/or other information provided by the one or more users. Accordingly, it would be desirable to implement techniques for improved generation and management of channel state information and/or other information relating to coordinated downlink communication in a CoMP communication system.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying one or more intra-node codebooks comprising a set of vector quantized entries relating to per-node channel conditions and one or more inter-node codebooks comprising a set of vector quantized entries relating to channel conditions between respective associated network nodes; selecting one or more intra-node codebooks or inter-node codebooks from which to provide channel state feedback to an associated network node; and providing channel state feedback to the associated network node corresponding to at least one selected codebook.

A second aspect described herein relates to a wireless communications apparatus, which can comprise a memory that stores data relating to one or more intra-node codebooks comprising a set of vector quantized entries relating to per-node channel conditions and one or more inter-node codebooks comprising a set of vector quantized entries relating to channel conditions between respective associated network nodes. The wireless communications apparatus can further comprise a processor configured to select one or more intra-node codebooks or inter-node codebooks from which to provide channel state feedback to an associated network node and to provide channel state feedback to the associated network node corresponding to at least one selected codebook.

A third aspect relates to an apparatus, which can comprise means for identifying one or more per-node channel state information (CSI) codebooks and one or more inter-node CSI codebooks constructed via vector quantization; means for selecting a per-node CSI codebook, an inter-node CSI codebook, or both a per-node CSI codebook and an inter-node CSI codebook from which channel state feedback is to be provided to one or more serving network nodes; and providing channel state feedback to the one or more serving network nodes based on one or more selected CSI codebooks.

A fourth aspect relates to a computer program product, which can comprise a computer-readable medium that comprises code for causing a computer to identify one or more per-node CSI codebooks and one or more inter-node CSI codebooks constructed via vector quantization; code for causing a computer to select a per-node CSI codebook, an inter-node CSI codebook, or both a per-node CSI codebook and an inter-node CSI codebook from which channel state feedback is to be provided to one or more serving network nodes; and code for causing a computer to provide channel state feedback to the one or more serving network nodes based on one or more selected CSI codebooks.

A fifth aspect described herein relates to a method, which can comprise analyzing one or more parameters relating to at least one of mobility of an associated user equipment unit (UE) or network backhaul conditions; selecting a downlink coordination strategy to be utilized across network nodes for communication with an associated UE based on one or more analyzed parameters; and instructing the associated UE to provide at least one of per-node or inter-node channel state feedback based at least in part on a selected downlink coordination strategy.

A sixth aspect described herein relates to a wireless communications apparatus, which can comprise a memory that stores data relating to a network user and a backhaul link between the wireless communications apparatus and at least one cooperative network node. The wireless communications apparatus can further comprise a processor configured to analyze respective parameters relating to at least one of mobility of the network user or condition of the backhaul link, to select a downlink coordination strategy to be utilized across network nodes for communication with the network user based on the respective parameters, and to instruct the network user to provide at least one of intra-node or inter-node channel state feedback based at least in part on the selected downlink coordination strategy.

A seventh aspect relates to an apparatus, which can comprise means for selecting a coordination strategy to be utilized across network nodes for downlink communication with a UE based on at least one of mobility of the UE, network backhaul conditions, or a number of associated transmit antennas and means for requesting one or more of per-node channel state feedback or inter-node channel state feedback from the UE based at least in part on a selected coordination strategy.

An eighth aspect relates to a computer program product, which can comprise a computer-readable medium that comprises code for causing a computer to select a coordination strategy to be utilized across network nodes for downlink communication with a UE based on at least one of mobility of the UE, network backhaul conditions, or a number of associated transmit antennas and code for causing a computer to request one or more of per-node channel state feedback or inter-node channel state feedback from the UE based at least in part on a selected coordination strategy.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
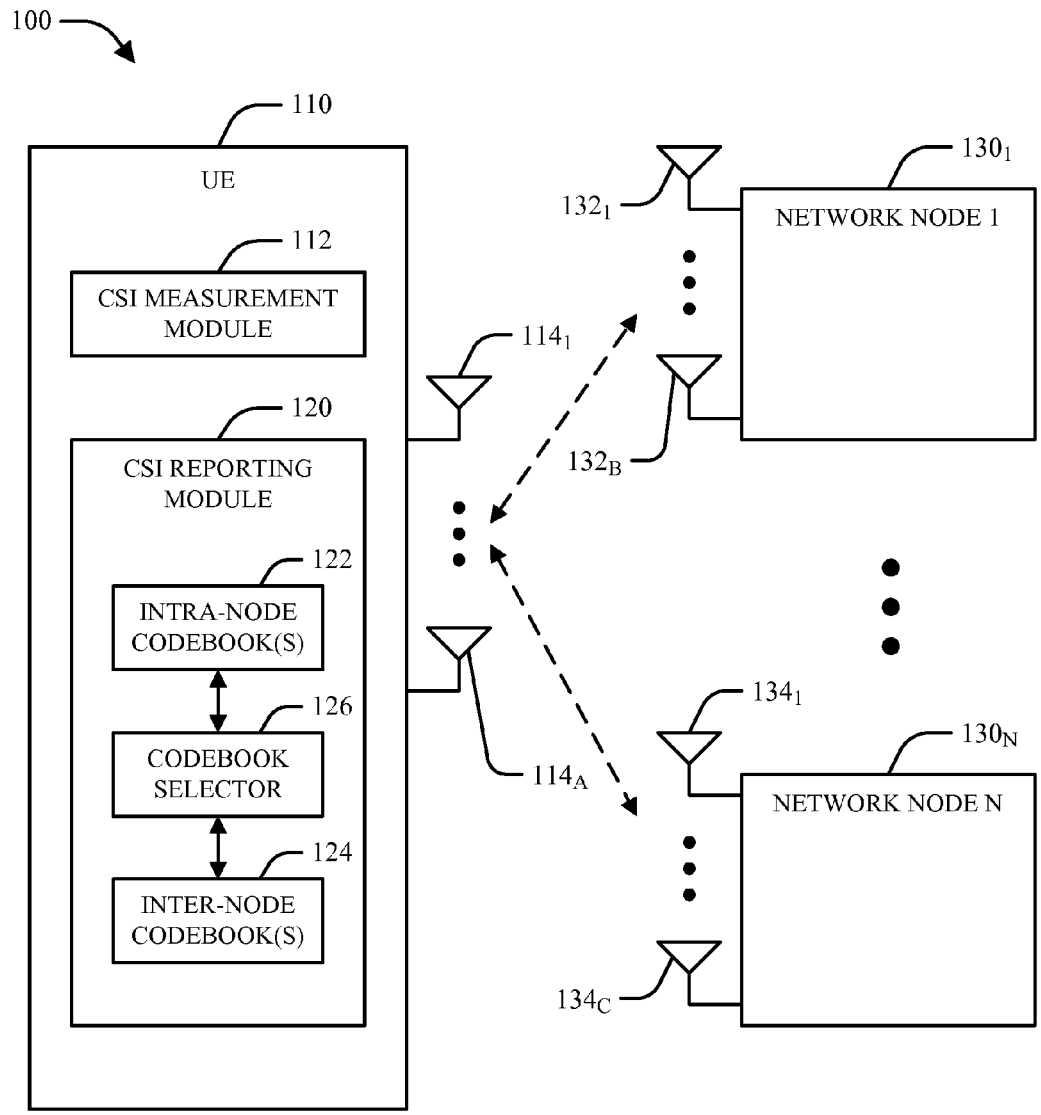
FIG. 1 is a block diagram of a system for selectively generating and communicating channel state feedback reports in a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 for selectively generating and communicating channel state feedback reports in a wireless communication system in accordance with various aspects. In one example, system 100 can include one or more UEs 110, which can communicate with one or more associated network nodes 130 (e.g., access points, cells, Node Bs, Evolved Node Bs (eNodeBs or eNBs), etc.). Respective network nodes 130 in system 100 can correspond to and/or provide communication coverage for any suitable coverage area(s), such as an area associated with a macro cell, a femto cell (e.g., an access point base station or Home Node B (HNB)), and/or any other suitable coverage area.

In accordance with one aspect, UE 110 can leverage one or more antennas 114 to conduct communicate with any suitable number of network nodes 130. Similarly, respective network nodes 130 can utilize any suitable uniform or non-uniform number of antennas 132 and/or 134 for communication with respective UEs 110 and/or other entities in system 100. In one example, UE 110 can conduct one or more uplink (UL, also referred to as reverse link (RL)) communications to network node(s) 130, and respective network nodes 130 can conduct one or more downlink (DL, also referred to as forward link (FL)) communications to UE 110. In accordance with another aspect, system 100 can utilize one or more network multiple-in-multiple-out (Network MIMO or N-MIMO), coordinated multipoint (CoMP), and/or other techniques, by which a single UE 110 can communicate with a plurality of disparate network nodes 130. It can be appreciated that CoMP communication as performed within system 100 can leverage any suitable strategy or combination of strategies for cooperation between network nodes 130. Such strategies can include, for example, silencing, frequency reuse, coordinated beamforming (CBF), cooperative interference nulling, joint transmission (JT), and/or any other suitable cooperation strategy or combination of strategies as described herein and/or as generally known in the art.

With further reference to FIG. 1, system 100 can utilize a downlink CoMP framework, in which multiple network nodes 130 can conduct cooperative transmission to one or more UEs 110 in order to substantially minimize inter-node interference, to enable combining of channel gains corresponding to multiple nodes 130 at a receiving UE 110, and/or to obtain other appropriate benefits. In one example, in order for respective network nodes 130 to provide cooperative gains, cooperative interference nulling, and/or other benefits of a downlink CoMP framework, respective network nodes 130 can be configured to leverage channel state information (CSI), such as channel state information of the transmitter (CSIT) relating to the respective network nodes 130. Accordingly, it can be appreciated that the extent to which respective entities in system 100 can benefit from downlink CoMP communication can in some cases be dependent on accuracy of CSIT information at respective cooperating network nodes 130.

In accordance with one aspect, CSIT can be provided to respective network nodes 130 by one or more associated UEs 110 in the form of CSIT feedback. In one example, a CSI measurement module 112 and/or another suitable mechanism associated with a UE 110 can conduct one or more channel measurements and/or otherwise obtain information relating to the state of a downlink channel between UE 110 and respective network nodes 130. Based on these measurements, a CSI reporting module 120 and/or other suitable means at UE 110 can generate corresponding CSIT feedback and report the generated feedback to one or more network nodes 130 serving UE 110.

In another example, CSIT feedback reported by a UE 110 can include information relating to precoding direction and/or any other suitable information. For example, a UE can maintain one or more codebooks of precoding vectors (e.g., in the case of single spatial stream transmission), precoding matrices (e.g., in the case of single or multi-user MIMO transmission), and/or any other suitable information. In one example, respective elements (e.g., vectors, matrices, etc.) of a codebook maintained by UE 110 can indicate an optimal beam (or set of beams) that corresponds to the downlink channel between the set of antennas 132 and/or 134 at a given network node 130 and UE 110. Based on such a codebook, UE 110 can provide CSIT feedback to a network node 130 that includes the index of the best entry in the codebook based on present downlink channel measurements. With regard to generating and utilizing a codebook in this manner, it can be appreciated that such a design can be based on quantization of respective beam vectors (or matrices of beams in the case of multiple MIMO streams), as opposed to separate quantization of each scalar coefficient of the respective precoding vectors or matrices.

It can further be appreciated that the above codebook design is based on the concept that scalar quantization of a multi-dimensional object (e.g., a vector, matrix, etc.) by, for example, quantizing each scalar entry of the multi-dimensional object separately and feeding back per-entry indices corresponding to the scalar entries, is inferior to vector quantization, wherein a multi-dimensional object is quantized in its corresponding multi-dimensional space. Accordingly, the example case described above utilizes precoding codebooks constructed using vector quantization, wherein a generated codebook contains entries respectively corresponding to a set of beams described by respective complex vectors of the appropriate dimension. Based on such entries, an associated UE 110 can provide as feedback to a network node 130 the index of a vector that matches best the downlink channel state measured at the UE 110 (e.g., via CSI measurement module 112).

In accordance with another aspect, the amount of feedback required for optimal downlink CoMP communication from respective network cells 130 to a UE 110 can depend on a coordination technique utilized by network cells 130. For example, if cooperative transmit interference nulling (e.g., via coordinated beamforming) is utilized by network cells 130, respective network cells 130 can in some cases require CSIT feedback corresponding to intra-node channel conditions of the respective network nodes 130. Alternatively, in the case of joint transmission (also referred to as joint processing, inter-site packet sharing, etc.) between network nodes 130, respective cooperating network nodes 130 can in some cases require information corresponding to intra-node channel conditions of the respective network nodes 130 as well as inter-node channel conditions between the nodes 130. As another alternative, a single-antenna network node 130 and/or another suitable network node 130 engaged in coordinated transmission with a UE 110 may in some cases require only information relating to inter-node channel conditions and may not require intra-node channel state feedback relating specifically to the network node 130. Specific examples of coordination techniques that can be utilized by network nodes 130 and feedback that can be provided by UE 110 to support such coordination techniques are provided in further detail herein.

Traditionally, solutions employed by wireless communication networks to overcome the issues associated with varying feedback requirements as described above can be divided into two categories. In a first example category, a super-codebook can be defined with dimensionality corresponding to the total number of transmit antennas across all nodes that could potentially cooperate. In such an example, an associated UE can perform vector quantization based on a channel vector (or matrix) that corresponds to the total number of the transmit antennas across all nodes that could possibly cooperate in serving this UE. By way of specific example, for a UE that could potentially benefit from joint transmission from any subset of a set of 3 nodes each equipped with 4 transmit antennas, the UE would be required to carry out vector quantization in a space of at least 12 dimensions to effectively utilize a super-codebook corresponding to all 3 nodes. More particularly, it can be appreciated that vector quantization in 12-dimensional space could be required in a scenario in which a single receive antenna is utilized at the UE or a form of feedback is utilized that corresponds to a single "equivalent" receive antenna. In contrast, in the event that multiple receive antennas are employed by a UE, it can be appreciated that the required space required for vector quantization could in some cases exceed 12 dimensions.

It can be appreciated that the category of approaches described above is associated with a substantial number of drawbacks that serve to limit the effectiveness of super-codebook designs in real world applications. By way of a first example, it can be appreciated that multi-dimensional quantization requires a relatively high degree of complexity that can be prohibitively costly for some applications. For instance, with reference to the above example, a UE would be required to perform vector matching in 12-dimensional space while the size of the corresponding codebook scales exponentially with the number of dimensions. Further, it can be appreciated that a super-codebook design can result in poor flexibility in managing quantization accuracy requirements for intra-node parameters (e.g., channels corresponding to the antennas of the same network node) and inter-node parameters (e.g., corresponding to relative channels across nodes). Different requirements for various parameter types can be a result of, for example, the fact that UE mobility has a stronger negative impact on inter-node parameter prediction accuracy, thereby making it desirable to maintain a lower accuracy for inter-node quantization to facilitate frequent updates of inter-node parameters (e.g., as opposed to intra-node quantization, which can be updated more slowly and accordingly more accurate). As a super-codebook design does not distinguish between inter-node and intra-node channel parameters, it can be appreciated that such distinctions cannot be made.

In addition, it can be appreciated that designing a single channel codebook in the manner described above can result in prohibitive codebook design and description complexity. It can be appreciated that this is a result of the fact that, for example, a codebook that is optimized for co-located antennas of a given node should take into account antenna configuration as well as the associated propagation environment. For instance, it can be appreciated that nodes with closely spaced antennas (e.g., spacing on the order of an associated wavelength) and/or relatively limited scattering in the transmitter (node) vicinity can in some cases have a different structure compared to nodes with widely spaced antennas (e.g., spacing on the order of several wavelengths) and/or relatively rich scattering in the transmitter (node) vicinity. Furthermore, it can be appreciated that relative channels across respective nodes can in some cases follow a rich scattering model as a result of generally large physical spacing between respective nodes. By way of specific example, the total number of intra-node codebook types that reasonably cover all relevant propagation and co-located antenna placing scenarios for a given system can be represented as $N_i$, while the total number of inter-node codebook types can be represented as $N_o$. Based on these definitions, the total number of super-codebook types that are required to be considered (e.g., in terms of design and codebook selection) for a system having up to n cooperating nodes is $N_o \cdot N_i^n$, which can be a substantially large number for, e.g., $n \geq 3$.

As an alternative to the super-codebook design described above, a second example category of conventional approaches for overcoming issues associated with varying feedback requirements for downlink CoMP communication involves utilizing an existing per-node codebook for providing feedback relative to each relevant node separately while additionally feeding back suitable quantized values of relative phases and/or amplitudes of channels between the respective nodes. Thus, referring to the specific examples of a UE in a 3-node system as described above, an associated UE would feed back 3 precoding indices corresponding to the codebooks of the 3 associated nodes, wherein each codebook corresponds to vector quantization of a channel corresponding to the transmit antennas of the respective nodes. In addition, the UE would also feed back 2 scalar values representing inter-node conditions (e.g., real or complex values, depending on whether phase only or both phase and amplitude is required). However, it can be appreciated that the latter step is performed by applying scalar quantization to a vector (or matrix) that captures relative channel gains and phases between the nodes. Accordingly, it can be appreciated that a loss of quantization efficiency (and related feedback efficiency) is incurred due to this scalar quantization of a vector object.

In accordance with one aspect, UE 110 can mitigate the shortcomings of the conventional techniques for generating and providing channel state feedback as described above by employing a CSI reporting module 120 that leverages a hybrid design for separable and hierarchical channel state feedback. In particular, CSI reporting module 120 can leverage one or more per-node or intra-node codebooks 122 to feed back channel state information corresponding to a downlink channel between all transmit antennas 132 and/or 134 of respective network nodes 130. Accordingly, in the example scenario above with 3 network nodes 130 respectively having 4 transmit antennas, UE 110 could feed back a set of 3 precoding indices corresponding to the intra-node codebooks 122 of the 3 nodes, wherein each intra-node codebook 122 is generated based on vector quantization of a channel corresponding to the 4 transmit antennas at the respective nodes.

Additionally or alternatively, CSI reporting module 120 can make use of one or more inter-node codebooks 124, which can be utilized to describe parameters characterizing relationships (e.g., relative phase and/or amplitude, etc.) between the channels corresponding to respective antennas 132 and/or 134 of different network nodes 130. In one example, both intra-node codebook(s) 122 and inter-node codebook(s) 124 can be constructed via vector quantization, thereby mitigating various shortcomings associated with conventional feedback strategies that rely on scalar quantization. Thus, it can be appreciated that an inter-node codebook 124 can be constructed and utilized based on vector quantization of respective inter-node channel parameters in a similar manner to intra-node codebook(s) 122. Referring again to the example of a 3-node system, a UE 110 can utilize CSI reporting module 120 to feed back a single precoding index that corresponds to the entry in a related inter-node codebook 124 that matches the set of inter-node channel parameters measured by CSI measurement module 112 at UE 110. In another example, the dimensionality of inter-node codebook(s) 124 can be based on the number of potentially cooperating nodes 130 in system 100. For example, it can be appreciated that an inter-node codebook corresponding to a 3-node system would include respective 3-dimensional entries.

In accordance with one aspect, CSI reporting module 120 can additionally include a codebook selector 126, which can be utilized by CSI reporting module 120 to select codebooks for which feedback is to be provided to respective network nodes 130 based on a coordination strategy to be employed by the respective network nodes 130. For example, codebook selector 126 can facilitate feedback based on intra-node codebook(s) 122 and/or inter-node codebook(s) 124 based on a number of network nodes 130 to be involved in coordination or transmission to UE 110, strategies for coordination to be performed across cells (e.g., beamforming, transmit nulling, joint transmission, etc.), or the like.

Figure 2:
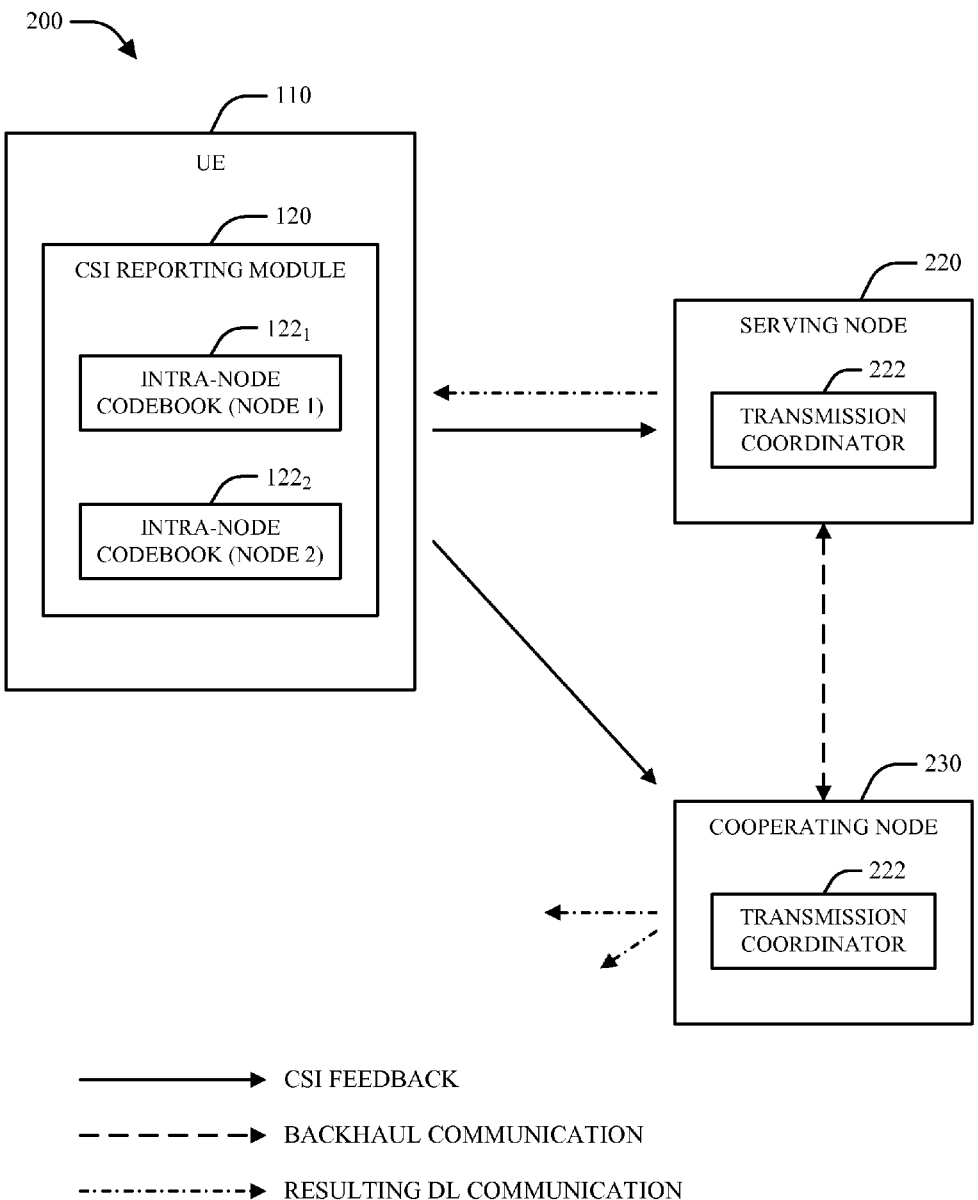
FIGS. 2-3 are block diagrams of respective systems for generating and processing separable channel state feedback to facilitate downlink CoMP communication in accordance with various aspects.

By way of a first specific example, downlink coordinated transmit interference nulling (or coordinated beamforming (CBF)) can be utilized by a wireless network for downlink CoMP coordination as illustrated in system 200 in FIG. 2. As system 200 illustrates, a serving node 220 for a UE 110 can select a transmit beam with the goal of radiating energy in the direction of UE 110 (e.g., in a similar manner to traditional non-cooperative beamforming) while simultaneously reducing the energy radiated in the direction of other UEs 110 that are served by neighboring nodes on the same time/frequency resources and could potentially receive interference from the serving node 220 (e.g., by way of being sufficiently close to the serving node 220). Thus, for a given UE 110, system 200 illustrates that a serving node 220 for UE 110 and a neighboring cooperating node 230 can utilize respective transmission coordinators 222 and/or other suitable means to facilitate downlink communication from serving node 220 to UE 110 with mitigated interference from cooperating node 230.

With respect to system 200, it can be appreciated that each node 220-230 involved in coordinated communication with UE 110 can in some cases be required to know channel state information relating to the downlink channel between transmit antennas at the respective nodes 220-230 and receive antennas associated with UE 110. Accordingly, a CSI reporting module 120 and/or other mechanisms associated with UE 110 can leverage respective intra-node codebooks 122 in order to enable UE 110 to provide channel state feedback relative to each associated network node 220-230 without requiring additional inter-node feedback for information relating to relationships between the channels corresponding to the respective nodes 220-230 (e.g., relative amplitude and phase information). By way of specific example, it can be appreciated that cooperative transmit interference nulling as illustrated by system 200 and/or other similar procedures can be utilized for UEs 110 with moderate mobility in the event that one or more associated nodes 220-230 have multiple transmit antennas.

Figure 3:
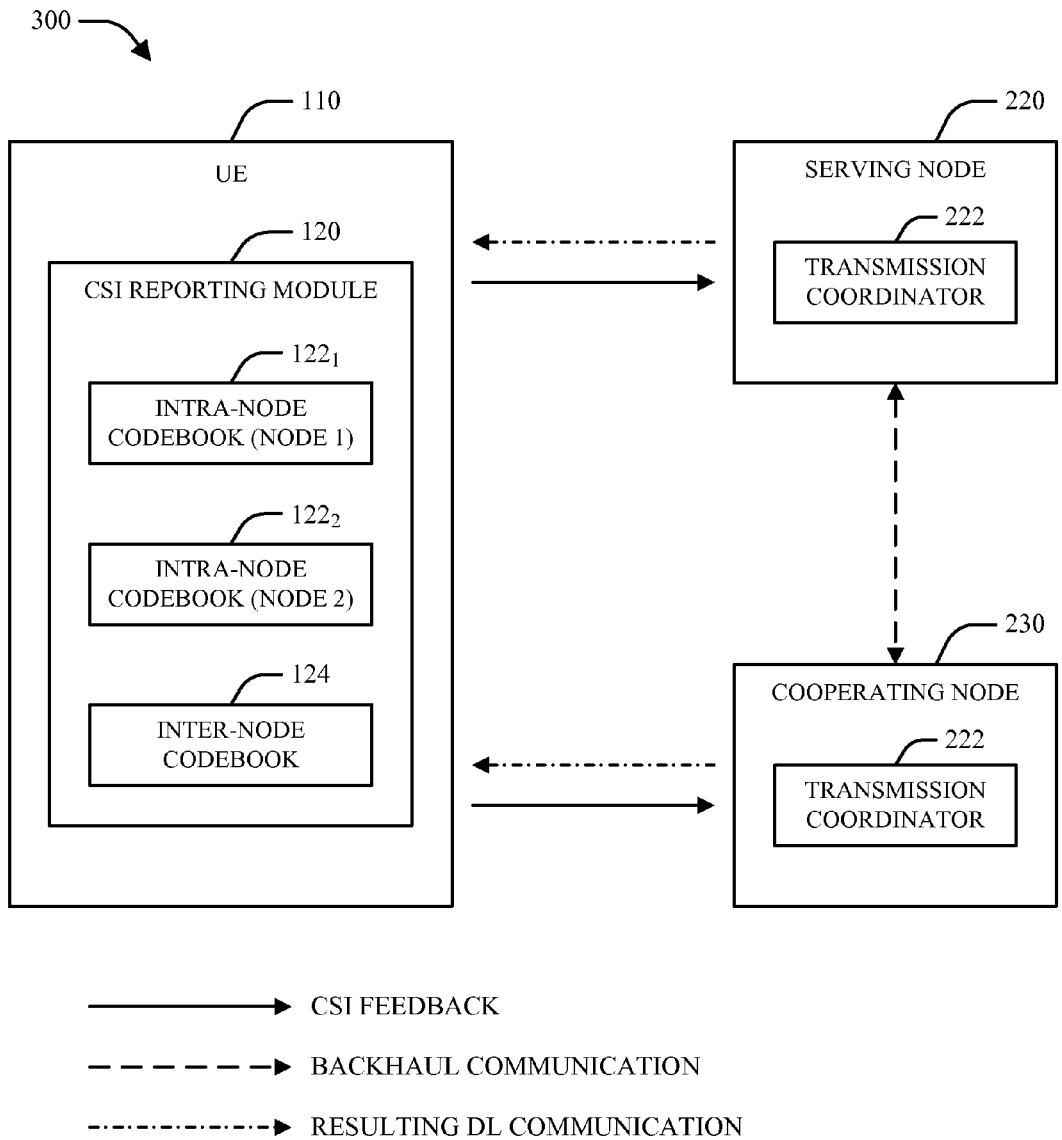

By way of a second example, joint processing (e.g., joint transmission (JT), inter-site packet sharing, etc.) can be utilized by a wireless network having respective network nodes 220-230 with one or more transmit antennas for downlink CoMP coordination as illustrated in system 300 in FIG. 3. As shown by system 300, a serving node 220 for a UE 110 can coordinate with one or more (potentially remote) cooperating nodes (e.g., via respective transmission coordinators 222) to jointly transmit one or more data packets to UE 110. It can be appreciated that while such a coordination scheme allows for energy combining from all cooperating nodes 220-230, interference mitigation from substantially all cooperating nodes 220-230 at UE 110, and other suitable benefits, cooperation in this manner relies on a fast broadband backhaul between nodes 220 and 230 to enable control and data transfer across the respective nodes 220-230.

In accordance with one aspect, to enable joint transmission as illustrated by system 300, a CSI reporting module 120 and/or other suitable means associated with UE 110 can utilize respective intra-node codebooks 122 to provide information relating to the channel state of the downlink channel corresponding to each associated node 220-230 separately in a similar manner to that illustrated by system 200. In addition, UE 110 can further leverage an inter-node codebook 124, which can be utilized to provide feedback to nodes 220-230 relating to relative amplitude and/or phase information corresponding to channels across nodes 220-230. Upon receiving such inter-node channel state information, respective nodes 220-230 involved in joint transmission to UE 110 can utilize the information to enable coherent combining of packet transmissions to UE 110 from the respective nodes 220-230.

Returning to FIG. 1, intra-node codebook(s) 122 and inter-node codebook(s) 124 can in accordance with one aspect be designed for use by UE 110 according to similar general principles. For example, a codebook 122 and/or 124 can convey a full channel description, wherein codebook entries are generated based on a representative distribution of complex channel vectors or the like. Additionally or alternatively, codebook description can be limited to the spatial direction only. In such a case, codebook entries can be generated based on a representative distribution of, for example, a set of eigen-directions, which can be defined as a distribution of vectors constrained to lie on a unit multi-dimensional sphere. Feedback constructed in such a manner can be utilized by, for example, a UE 110 that generally receives transmissions corresponding to a channel quality indicator (CQI) rank of 1 due to capability, interference, or the like. In such a case, it can be appreciated that feedback relating to a principal eigen-component corresponding to an effective single-antenna channel that would result from applying an optimal receiver configuration can be provided in place of full channel feedback in order to increase feedback efficiency.

In accordance with one aspect, hierarchical eigen-feedback as generally described above can be utilized to provide feedback relating to eigen-components of a channel as opposed to the entire channel between all associated transmit (TX) antennas and all associated receive (RX) antennas. Additionally or alternatively, a UE 110 can assume a given RX processing scheme in order to compress a MIMO channel between $M_{TX}$ transmit antennas 132 and/or 134 across all reported network nodes 130 and $M_{RX}$ antennas 114 at the UE 110 to an equivalent multi-in-single-out (MISO) channel between $M_{TX}$ transmit antennas 132 and/or 134 across all reported network nodes 130 and a (single) RX combiner output at the UE 110 corresponding to a given MIMO stream. Accordingly, in the case of (up to) rank-K or, equivalently, K MIMO streams, UE 110 can be configured to feedback K of such $M_{TX}$ vectors.

Eigen-feedback can be employed as a specific, non-limiting example of the above, wherein a RX combiner at UE 110 is associated with the corresponding eigen-component of the channel. In a scenario in which hierarchical feedback is utilized, each vector of size $M_{TX}$ (e.g., corresponding to a MIMO stream) can be broken into intra-node components that correspond to TX antennas 132 and/or 134 of respective network nodes 130 and inter-node components capturing relative amplitude/phase across network nodes 130.

In a further example, codebook entries can be constructed to represent quantized downlink beams (or matrices) that are recommended by UE 110 to one or more network nodes 130 in addition to or in lieu of quantized downlink channel information. In any such example, the structure of codebooks 122-124 can in some cases match corresponding antenna configurations (e.g., with respect to antenna spacing, etc.) and anticipated typical channel propagation conditions.

Figure 4:
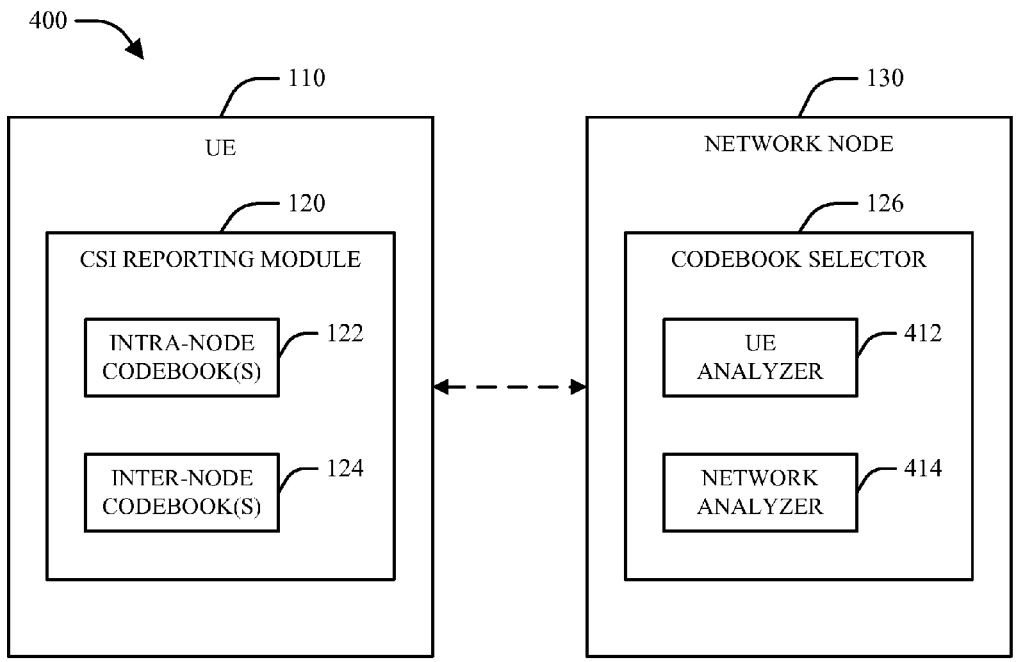
FIG. 4 is a block diagram of a system that facilitates network-driven channel state feedback for downlink CoMP communication in accordance with various aspects.

In accordance with another aspect, selection of codebook(s) to be utilized by a given UE can be performed by respective associated network nodes in addition to or in place of a determination by the UE itself. This is illustrated by system 400 in FIG. 4, wherein a network node 130 associated with a given UE 110 utilizes a codebook selector 126 in order to control respective codebooks 122-124 that are utilized by UE 110 in providing channel state feedback to network node 130. As described above, it can be appreciated that inter-node channel state information can be utilized to enable joint processing, which can in some cases be utilized only for low mobility UEs and in scenarios where a good backhaul link between network nodes exists. Alternatively, intra-node channel state information as described herein can be utilized in less restrictive configurations. Accordingly, based on UE conditions and network properties (e.g., as observed by a UE analyzer 412 and a network analyzer 414, respectively), a codebook selector 126 and/or other means associated with a network node 130 can selectively enable intra- and inter-node feedback, intra-node feedback, or none of the two. Additionally or alternatively, in the case of a single antenna network node 130, codebook selector 126 can be configured to enable inter-node feedback only.

Figure 5:
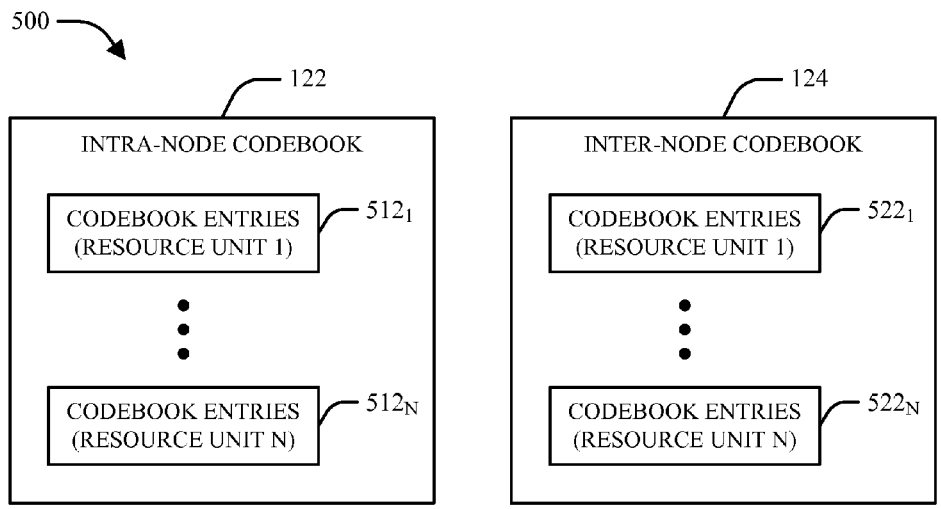
FIG. 5 illustrates example codebook configurations that can be utilized for reporting channel state feedback in accordance with various aspects.

Turning next to FIG. 5, a diagram 500 is provided that illustrates example codebook configurations that can be utilized for reporting channel state feedback in accordance with various aspects. As generally described herein, it can be appreciated that channel state feedback as provided by an intra-node codebook 122 and/or an inter-node codebook 124 can be utilized in the context of broadband channel characterization (based on, for example, a single characterization across an entire associated frequency band), which can provide substantial accuracy for UEs with low frequency channel selectivity. Alternatively, as shown in diagram 500, respective codebooks 122 and/or 124 utilized for channel state feedback can contain respective entries 512 and/or 522 that are defined on a per-resource unit (e.g., sub-band, resource block, etc.) basis. In another example, channel descriptions as utilized herein can additionally or alternatively apply in the time (e.g., propagation delay tap) domain.

Referring now to FIGS. 6-9, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 6:
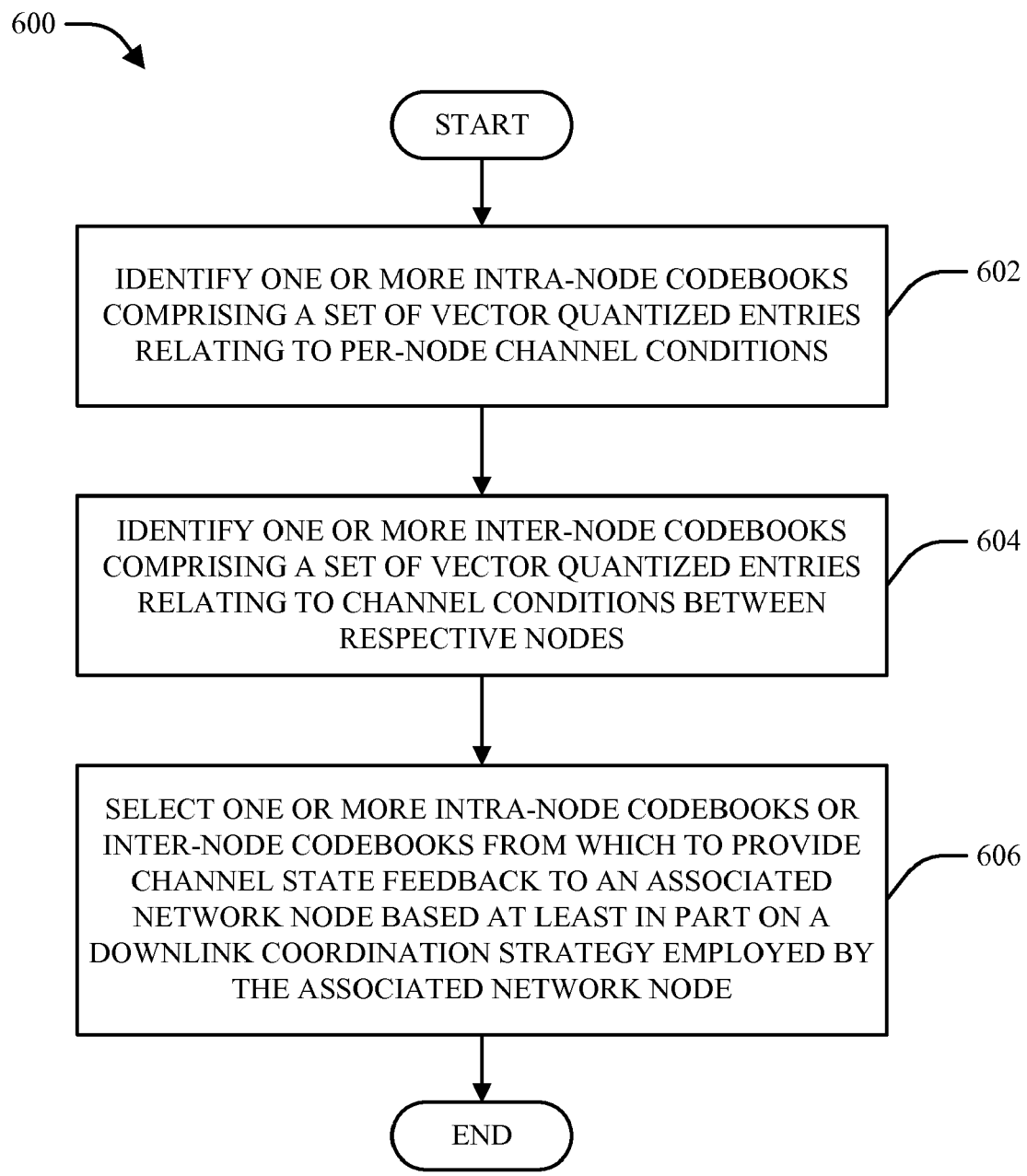
FIGS. 6-8 are flow diagrams of respective methodologies for generating and reporting hierarchical channel state feedback in a wireless communication system.

With reference to FIG. 6, illustrated is a methodology 600 for generating and reporting hierarchical channel state feedback in a wireless communication system. It is to be appreciated that methodology 600 can be performed by, for example, a user device (e.g., UE 110) and/or any other appropriate network device. Methodology 600 can begin at block 602, wherein one or more intra-node codebooks (e.g., intra-node codebooks 122) are identified that comprise a set of vector quantized entries relating to per-node channel conditions (e.g., conditions associated with respective network nodes 130). Next, at block 604, one or more inter-node codebooks (e.g., inter-node codebooks 124) are identified that comprise a set of vector quantized entries relating to channel conditions between respective nodes (e.g., relative phase and/or amplitude between respective network nodes 130). Methodology 600 can then conclude at block 606, wherein one or more intra-node codebooks identified at block 602 and/or inter-node codebooks identified at block 604 are selected (e.g., by a codebook selector 126) as a basis on which channel state feedback is provided to an associated network node (e.g., via a CSI reporting module 120) based at least in part on a downlink coordination strategy (e.g., JT, CBF, etc.) employed by the associated network node.

Figure 7:
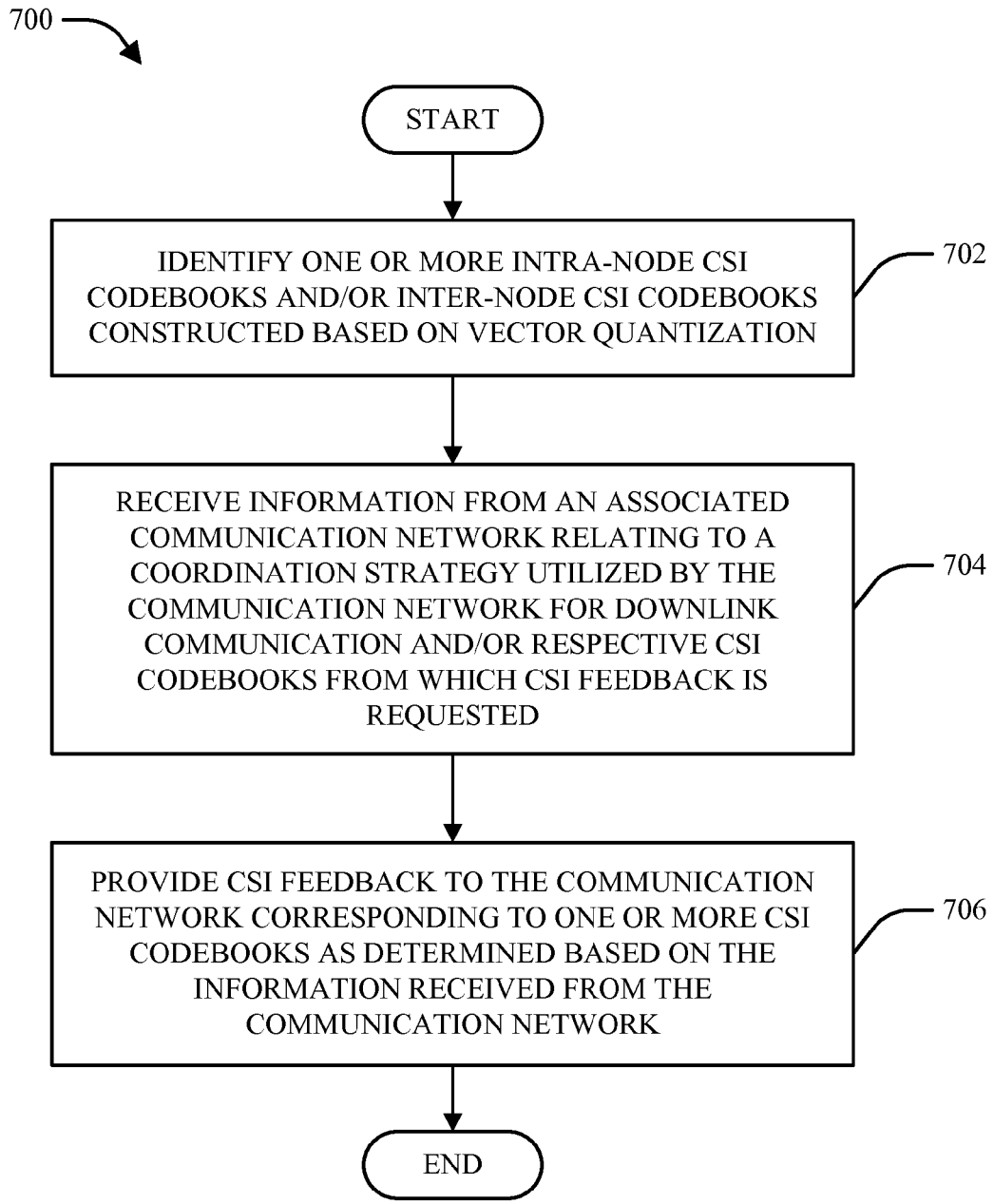

Turning next to FIG. 7, a flow diagram of a second methodology 700 for generating and reporting hierarchical channel state feedback in a wireless communication system is illustrated. Methodology 700 can be performed by, for example, a UE and/or any other appropriate network entity. Methodology 700 begins at block 702, wherein one or more intra-node CSI codebooks and/or inter-node CSI codebooks are constructed based on vector quantization. Next, at block 704, information is received from an associated communication network (e.g., via a network node 130) relating to a coordination strategy utilized by the communication network for downlink communication and/or respective CSI codebooks from which CSI feedback is requested. Methodology 700 can then conclude at block 706, wherein CSI feedback is provided to the communication network that corresponds to one or more CSI codebooks identified at block 702 as determined based on the information received from the communication network at block 704.

Figure 8:
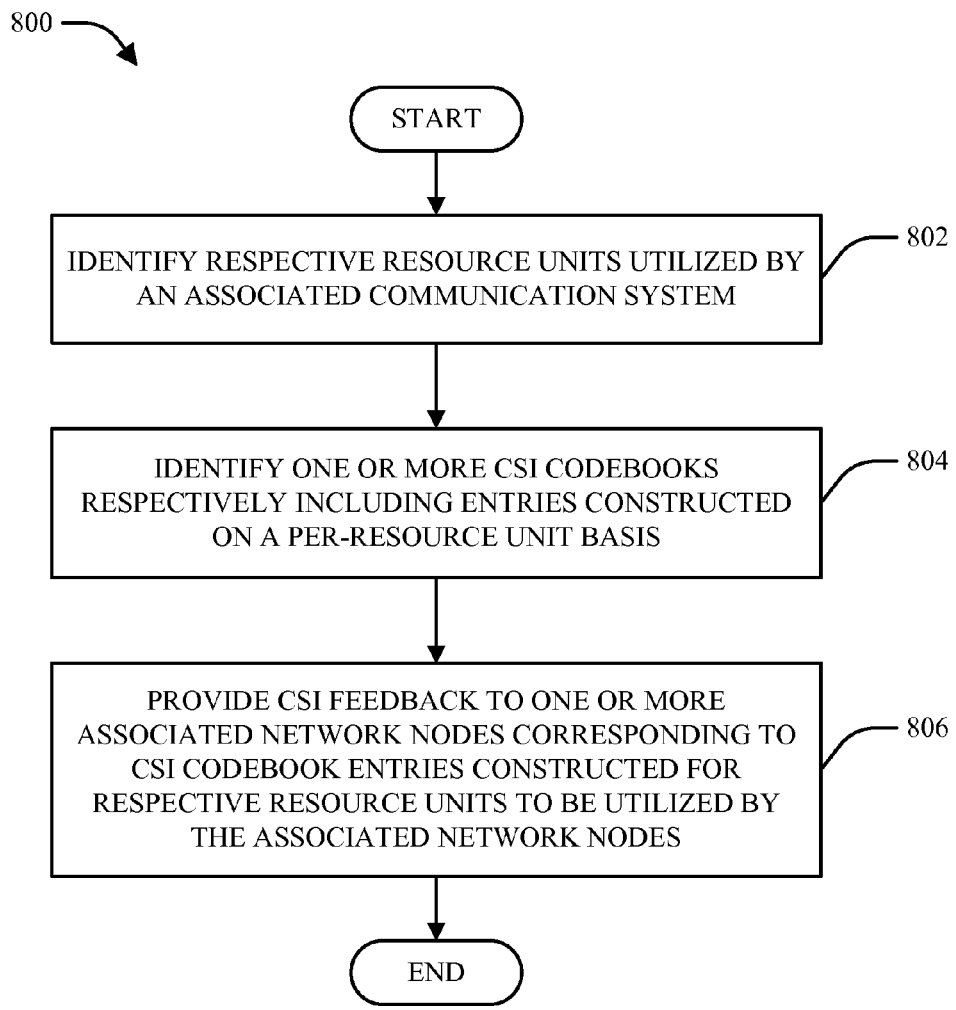

FIG. 8 illustrates a methodology 800 for generating and reporting hierarchical channel state feedback on a per-resource unit basis. Methodology 800 can be performed by, for example, a mobile station and/or any other appropriate network entity. Methodology 800 begins at block 802, wherein respective resource units (e.g., time interlaces, resource blocks, frequency sub-bands, etc.) utilized by an associated communication system are identified. Next, at block 804, one or more CSI codebooks are identified that respectively include entries that are constructed on a per-resource unit basis. Finally, methodology 800 can conclude at block 806, wherein CSI feedback is provided to one or more associated network nodes that corresponds to entries in the CSI codebook(s) identified at block 804 that are constructed for respective resource units to be utilized by the associated network nodes.

Figure 9:
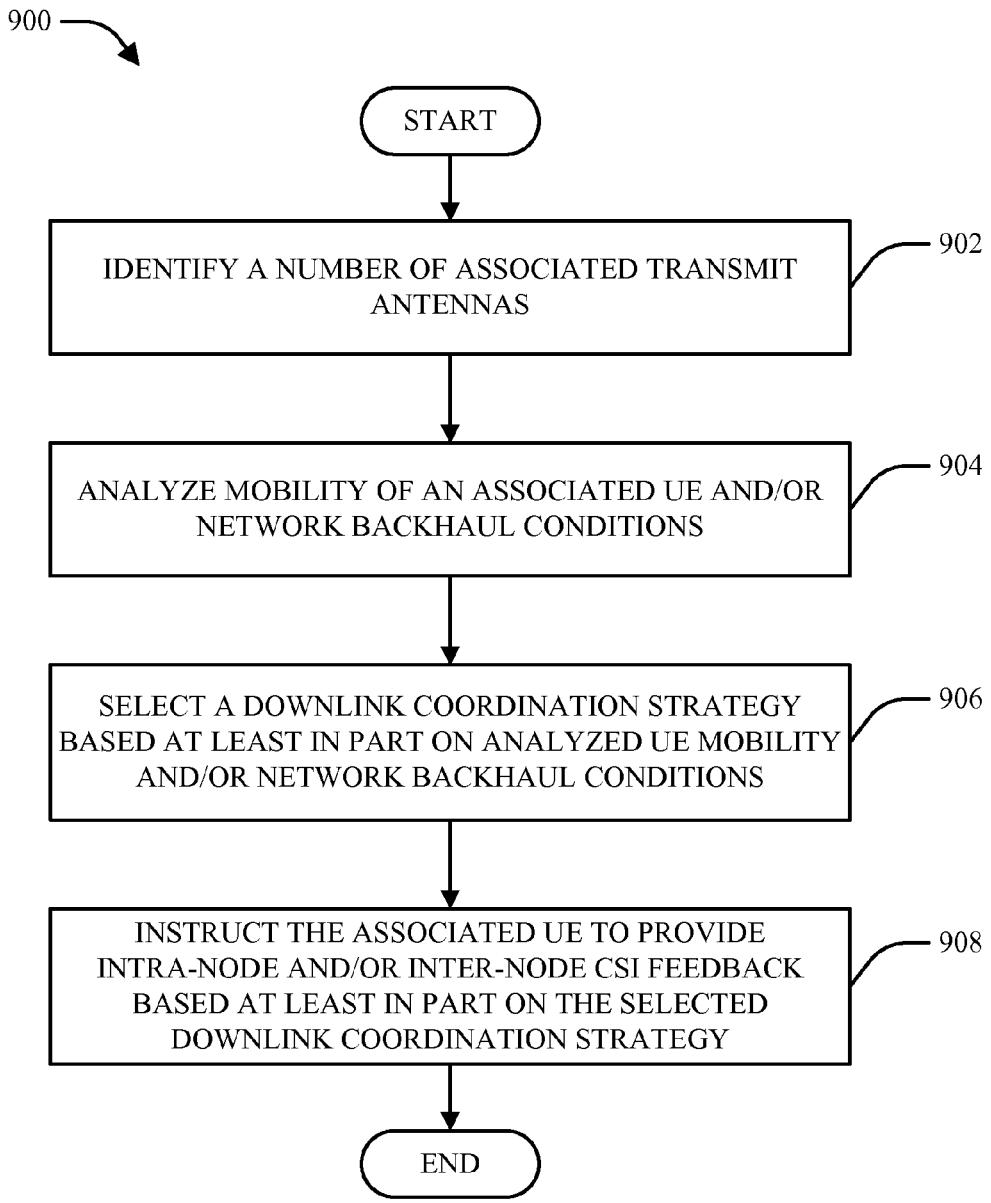
FIG. 9 is a flow diagram of a methodology for managing separable channel state feedback reports in a wireless communication system.

With reference next to FIG. 9, illustrated is a methodology 900 for managing separable channel state feedback reports in a wireless communication system. It is to be appreciated that methodology 900 can be performed by, for example, a network node (e.g., network node 130), a communication network controller, and/or any other appropriate network entity. Methodology 900 can begin at block 902, wherein a number of transmit antennas (e.g., transmit antennas 132 and/or 134) associated with an entity performing methodology 900 is identified. At block 904, analysis is performed relative to mobility of an associated UE (e.g., UE 110) and/or network backhaul conditions. Methodology 900 can then continue to block 906, wherein a downlink coordination strategy is selected based at least in part on the identification performed at block 902 and/or the analysis performed at block 904. Based at least in part on the downlink coordination strategy selected at block 906, an associated UE can subsequently be instructed (e.g., via a codebook selector 126) to provide intra-node and/or inter-node CSI feedback.

Figure 10:
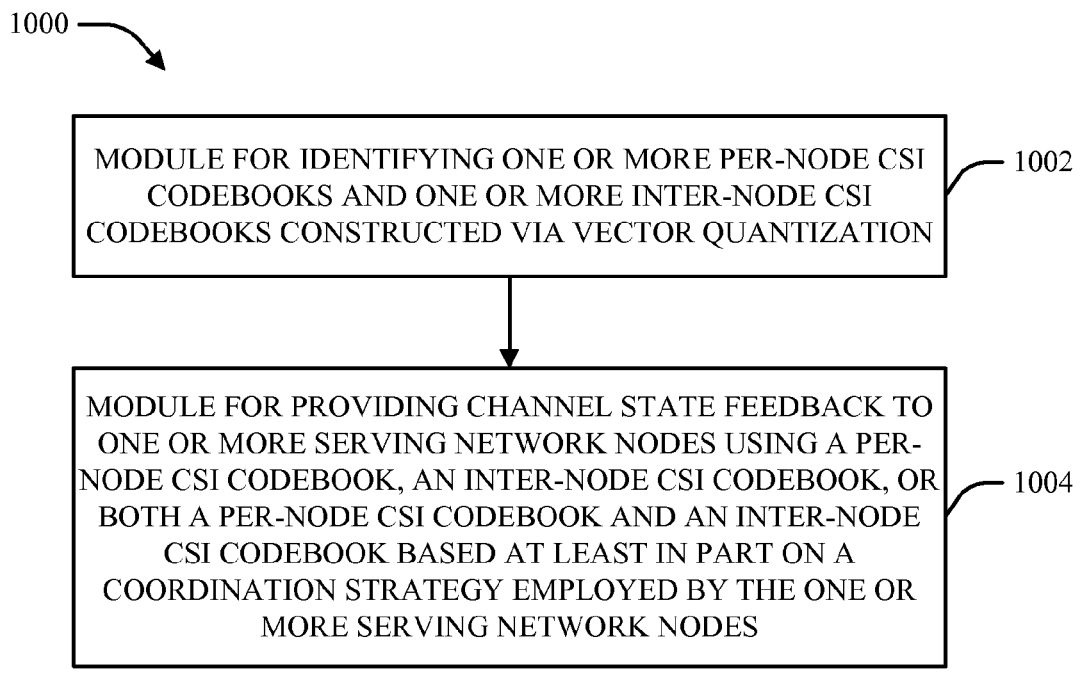
FIGS. 10-11 are block diagrams of respective apparatuses that facilitate generation, reporting, and processing of improved channel state feedback for downlink CoMP coordination.
Figure 11:
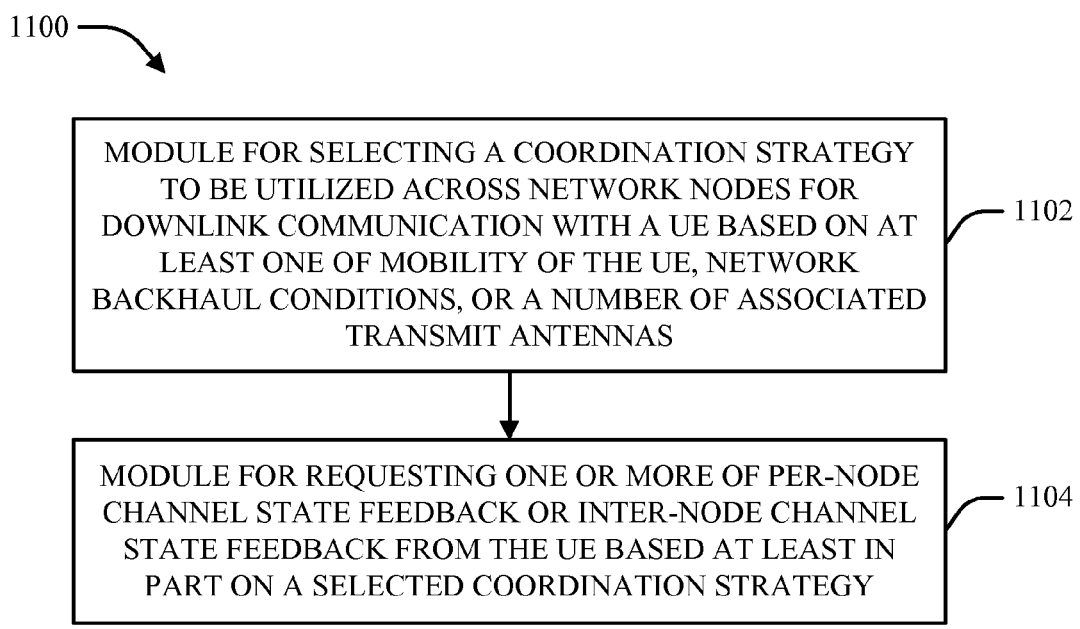

Referring now to FIGS. 10-11, respective apparatuses 1000-1100 that facilitate generation, reporting, and processing of improved channel state feedback for downlink CoMP coordination are illustrated. It is to be appreciated that apparatuses 1000-1100 are represented as including functional blocks, which can be functional blocks that represent functions implemented by a processor, software, or combination thereof (e.g., firmware).

With reference first to FIG. 10, an apparatus 1000 that facilitates hierarchical channel state feedback for downlink CoMP coordination is illustrated. Apparatus 1000 can be implemented by a UE (e.g., UE 110) and/or another suitable network entity and can include a module 1002 for identifying one or more per-node CSI codebooks and one or more inter-node CSI codebooks constructed via vector quantization and a module 1004 for providing channel state feedback to one or more serving network nodes using a per-node CSI codebook, an inter-node CSI codebook, or both a per-node CSI codebook and an inter-node CSI codebook based at least in part on a coordination strategy employed by the one or more serving network nodes FIG. 11 illustrates another apparatus 1100 that facilitates separable channel state feedback for downlink CoMP coordination. Apparatus 1100 can be implemented by a network cell and/or another suitable type of network node (e.g., network node 130) or any another suitable network entity and can include a module 1102 for selecting a coordination strategy to be utilized across network nodes for downlink communication with a UE based on at least one of mobility of the UE, network backhaul conditions, or a number of associated transmit antennas and a module 1104 for requesting one or more of per-node channel state feedback or inter-node channel state feedback from the UE based at least in part on a selected coordination strategy.

Figure 12:
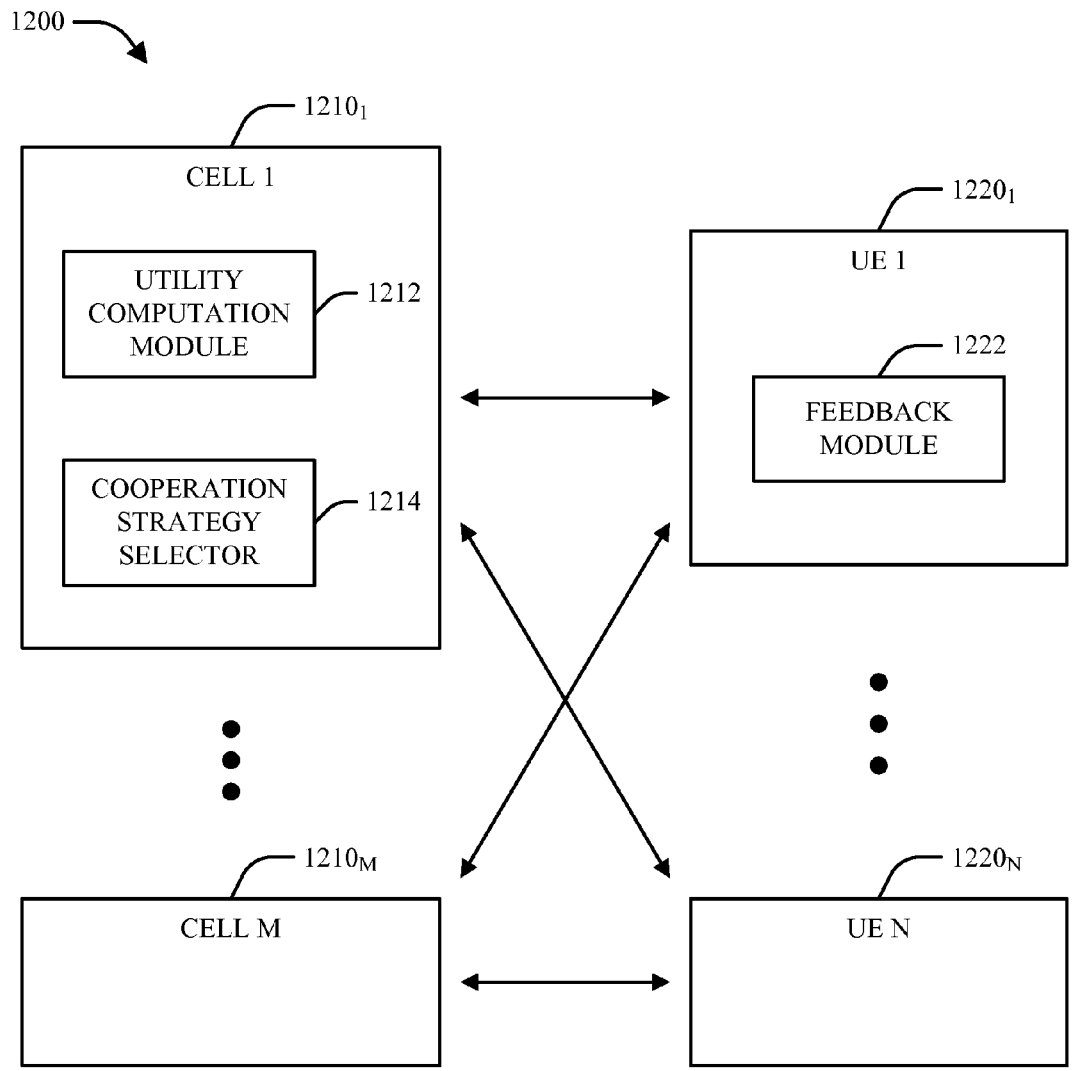
FIGS. 12-13 are block diagrams of respective example systems that facilitate coordinated multipoint communication in accordance with various aspects described herein.

Referring now to FIG. 12, an example system 1200 that facilitates coordinated multipoint communication in accordance with various aspects is illustrated. As illustrated in FIG. 12, system 1200 can include one or more network cells 1210 and/or other network nodes, which can communicate with respective UEs 1220 as generally described herein. In accordance with one aspect, respective cells 1210 in system 1200 can coordinate pursuant to one or more cooperation strategies in order to increase data rates associated with communication with a given UE 1220 and/or to reduce interference caused to other cells 1210 and/or UEs 1220 in system 1200. In one example, respective cells 1210 in system 1200 can be operable to utilize various cooperation techniques for uplink and/or downlink communication with one or more UEs 1220, such as coordinated silencing (CS), joint transmission (JT) via inter-eNodeB (inter-cell) packet sharing, coordinated beamforming (CBF), and/or any other suitable cell cooperation technique(s) as generally known in the art.

In another example, various operational aspects of system 1200, such as respective cell cooperation techniques to be utilized for communication, cells 1210 to be utilized for such cooperation techniques, and respective UEs 1220 to be served via cooperative communication, can be controlled by a utility computation module 1212 and/or other suitable mechanisms of respective cells 1210. Further, determinations made by utility computation module 1212 can be supported at least in part by marginal utility calculations performed by one or more cells 1210 (e.g., via a utility computation module 1214) and/or any other suitable metric.

In general, a cooperation strategy selector 1214 can be utilized by a cell 1210 to compute and/or make scheduling decisions relating to node clustering, scheduling, forms of cooperative transmission to be utilized, and so on. A cooperation strategy can be selected by cooperation type selector 1214 based on factors such as UE mobility, C/I levels associated with respective UEs 1220, capabilities of backhaul links between respective cells, or the like. By way of example, cooperation type selector 1214 can select CS and/or another similar simple form of cell cooperation in the case of high-mobility UEs and/or rapidly changing channel conditions associated with a given UE 1220. Additionally or alternatively, if mobility of a given UE 1220 is determined to be low, or a high degree of antenna correlation is present with respect to the UE 1220, more advanced cooperation techniques such as JT via inter-cell packet sharing (e.g., in the case of a relatively slow backhaul link between cells 1210) or CBF (e.g., in the case of a relatively fast backhaul link between cells 1210) can be selected. In another example, utility computation module 1212 and/or cooperation strategy selector 1214 can operate based at least in part on information obtained from respective UEs 1220 (e.g., via a feedback module 1222 at the respective UEs 1220).

In accordance with one aspect, a projected rate associated with respective UEs 1220 can be calculated (e.g., by utility computation module 1212) and leveraged with factors such as backhaul bandwidth, latency constraints, or the like, to select between respective cooperation techniques. For example, cooperation type selector 1212 can rule out a JT technique using backhaul bandwidth and latency uncertainty based on associated a priori and/or long-term backhaul link classifications. In another example, channel state information at the transmitter (CSIT) delivery delay and accuracy, as well as scheduling delay and/or other suitable factors, can be factored in projected rate calculation.

By way of specific example, cooperation type selector 1214 can utilize a set of cooperation technique selection rules as follows. First, cooperation type selector 1214 can rule out a JT technique based on a long-term backhaul link classification. Further, cooperation type selector 1214 can consider CBF techniques over JT in the event that a ratio of a combined energy C/I to the best node C/I is below a predefined threshold. In addition, if an associated channel prediction error is above a threshold value, cooperation type selector 1214 can consider CS (e.g., in the event that CBF and/or JT are possible).

In accordance with another aspect, utility computation module 1212 can compute per-UE projected rates based on various factors. These factors can include, for example, propagation channels for respective links involved in a utilized cooperation strategy (e.g., taking into account power and bandwidth resources allocated per link); channel prediction accuracy based on projected downlink estimation error at respective UEs 1220 and corresponding feedback delay; anticipated interference levels from cooperative and non-cooperative network nodes (e.g., cells 1210 and/or UEs 1220), taking into account spatial interference structures as applicable; and/or any other suitable factors. In one example, respective UEs 1220 in system 1200 can provide information relating to downlink estimation errors, feedback delay, UE processing loss, interference nulling capability, and/or other information relating to the operational capabilities of the respective UEs 1220 to respective cells 1210 via feedback module 1222 and/or any other suitable means.

In one example, utility computation module 1212 can perform utility computations for a given UE 1220 based on various requirements for channel state information at the transmitter (CSIT). CSIT requirements can vary, for example, based on a cooperation strategy employed by respective cells 1210 with respect to a given UE 1220. By way of specific example, it can be appreciated that CSIT requirements associated with iterative signal processing and/or CBF can differ substantially between CSIT requirements for CS. In one example, a cell 1210 can utilize an assumption of accurate CSIT at moderate to high post-processing carrier to interference (C/I) levels in order to employ first order approximation of an associated CSIT effect. Additionally or alternatively, in the event that a substantially high error effect (e.g., due to spatial error) is encountered, CS can be favored by cell 1210 over more complex signal processing techniques. In accordance with one aspect, a threshold at which CS is selected over such techniques can be based on an empirical measure of channel prediction, as described in further detail herein.

In accordance with a further aspect, cooperation strategy selector 1214 can utilize one or more strategy utility maximization techniques for optimizing a cooperation strategy to be utilized with respect to respective UEs 1220. For example, one or more iterative utility maximization algorithms (e.g., algorithms similar to iterative pricing) can be utilized, wherein an iterative search is performed at respective network nodes (e.g., cells 1210, sectors within cells 1210, etc.) for respective candidate cooperation strategies. In one example, various cooperation technique constraints can be considered, which can be, for example, reflected in constraints on the beam coefficients of various nodes. In another example, first order extension can be utilized to update respective beam weights at respective iterations until convergence. In various implementations, convergence can be made dependent on an algorithm starting point, which can be selected in a variety of manners. For example, a starting point can be selected via zero-forcing (ZF) across respective cooperating nodes, maximum ratio combining (MRC) and/or MMSE-based approaches, or the like. In one example, power allocation techniques can be applied in addition to ZF and/or MRC.

Figure 13:
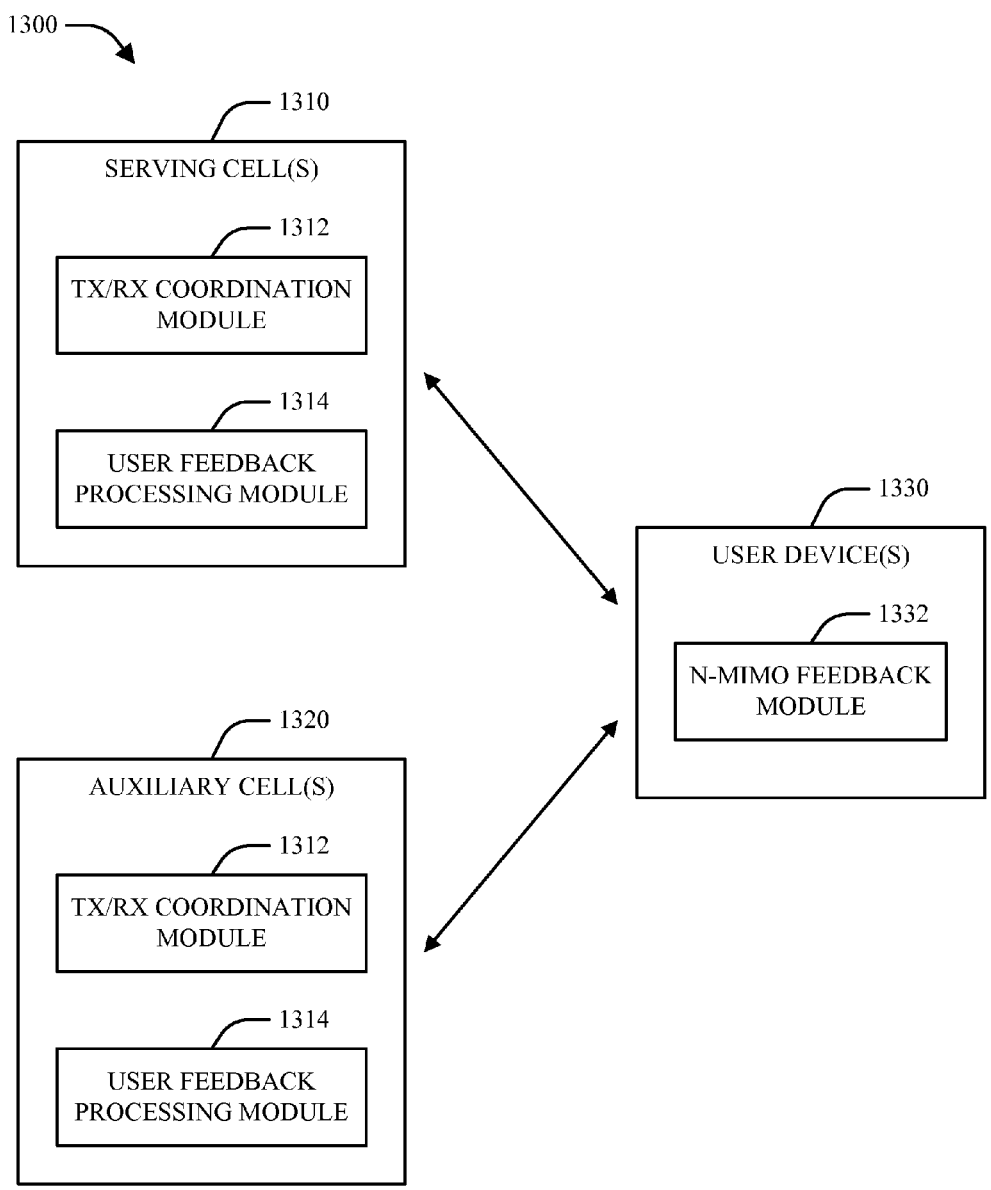

Referring next to FIG. 13, an example system 1300 that facilitates coordinated multipoint communication in accordance with various aspects described herein is illustrated. As FIG. 13 illustrates, system 1300 can include respective user devices 1330 that can communicate with one or more associated network cells, such as serving cell(s) 1310 and auxiliary cell(s) 1320. It should be appreciated, however, that no functionality of cells 1310-1320 is intended to be implied by the naming of "serving cell(s)" 1310 and "auxiliary cell(s)" 1320. For example, it should be appreciated that an auxiliary cell 1320 can serve a user device 1330 by providing communication coverage for user device 1330 in addition to, or in place of, a serving cell 1310 in some cases.

In accordance with one aspect, respective serving cells 1310 and auxiliary cells 1320 can cooperate to perform N-MIMO or CoMP communication with one or more user devices 1330. For example, various techniques can be utilized to facilitate cooperation between respective cells 1310-1320, between respective sectors associated with one or more cells 1310-1320, and/or any other suitable network entities. Such cooperation can be facilitated by, for example, a TX/RX coordination module 1312 associated with respective cells 1310-1320 and/or any other suitable mechanism(s). Further, TX/RX coordination module 1312 can facilitate cooperation between respective network entities according to any suitable network cooperation strategy(ies), such as fractional frequency reuse, silencing, coordinated beamforming, joint transmission, or the like.

In one example, coordinated beamforming can be conducted between network nodes associated with respective cells 1310-1320 by coordinating transmissions from the respective cells 1310-1320 such that if a transmission to a user device 1330 occurs from a given cell 1310 or 1320, a beam is chosen to serve the user device 1330 by the given cell 1310 or 1320 such that the transmission to the user device 1330 is orthogonal or otherwise substantially mismatched to user devices scheduled on neighboring cells 1310 and/or 1320. By doing so, it can be appreciated that beamforming gains can be realized for a desired user device 1330 while simultaneously reducing the effects of interference on neighboring network devices. In one example, coordinated beamforming can be facilitated by performing scheduling, beam selection, user selection (e.g., by selecting user devices 1330 having desirable beams that substantially limit interference at neighboring devices), or the like.

Additionally or alternatively, joint transmission can be conducted between a plurality of network nodes and a given user device 1330 by, for example, pooling resources designated for transmission to a given user device 1330 and transmitting the pooled resources via multiple distinct network nodes (e.g., nodes corresponding to a serving cell 1310 as well as an auxiliary cell 1320). For example, instead of a first cell transmitting a modulation symbol x to a first user and a second cell transmitting a modulation symbol y to a second user, the cells can cooperate such that the first cell transmits ax+by to one or both of the users and the second cell transmits cx+dy to the same user(s), where a, b, c, and d are coefficients chosen to optimize the signal-to-noise ratio (SNR) of the users, system capacity, and/or any other suitable metric(s). In one example, resource pooling among network nodes corresponding to different cells 1310-1320 can be conducted via a backhaul link between the cells 1310-1320 and/or any other suitable mechanism. In another example, similar techniques can be utilized for uplink joint transmission, wherein a user device 1330 can be configured to transmit data, control signaling, and/or other appropriate information to multiple network nodes.

In accordance with one aspect, various aspects of uplink and downlink CoMP communication can be based on feedback provided by respective user devices 1330. For example, a N-MIMO feedback module 1332 at respective user devices 1330 can be utilized to provide feedback to various cells 1310-1320, which in turn can utilize a user feedback processing module 1314 and/or other suitable means to utilize the feedback in conducting cooperative communication within system 1300. By way of example, in the case of downlink CoMP communication, a N-MIMO feedback module 1332 at user device(s) 1330 can facilitate channel reporting to respective cells 1310-1320 of respective serving cells as well as one or more neighboring non-cooperative cells. By way of another example, in the case of uplink CoMP communication, N-MIMO feedback module 1332 can provide feedback information to respective cells 1310-1320 in combination with respectively scheduled uplink transmissions to the cells 1310-1320 that can be utilized by the cells 1310-1320 to facilitate the removal of interference from the corresponding uplink transmissions.

Figure 14:
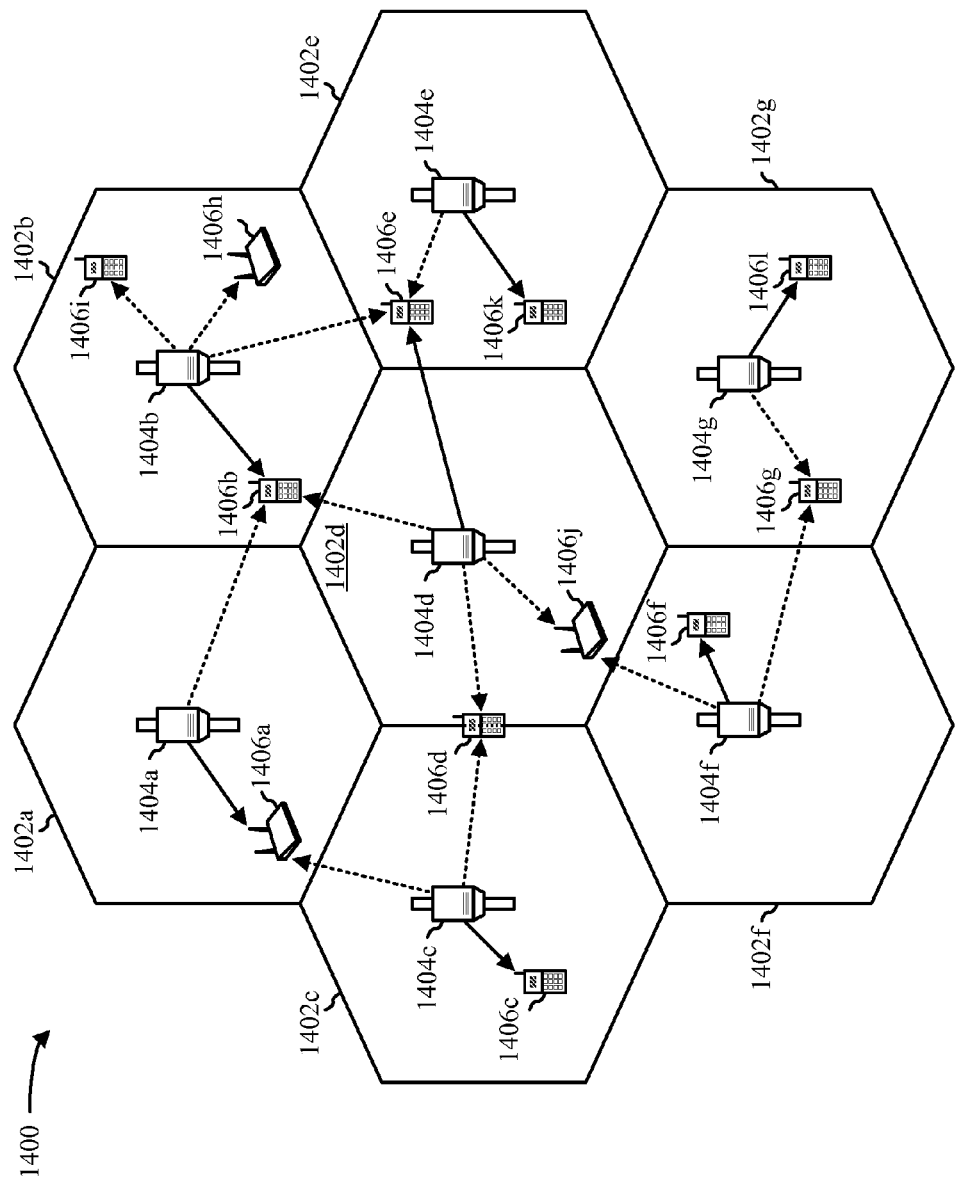
FIG. 14 illustrates an example wireless communication system in accordance with various aspects set forth herein.

Turning to FIG. 14, an exemplary wireless communication system 1400 is illustrated. In one example, system 1400 can be configured to support a number of users, in which various disclosed embodiments and aspects can be implemented. As shown in FIG. 14, by way of example, system 1400 can provide communication for multiple cells 1402, (e.g., macro cells 1402a-1402g), with respective cells being serviced by corresponding access points (AP) 1404 (e.g., APs 1404a-1404g). In one example, one or more cells can be further divided into respective sectors (not shown).

As FIG. 14 further illustrates, various access terminals (ATs) 1406, including ATs 1406a-1406k, can be dispersed throughout system 1400. In one example, an AT 1406 can communicate with one or more APs 1404 on a forward link (FL) and/or a reverse link (RL) at a given moment, depending upon whether the AT is active and whether it is in soft handoff and/or another similar state. As used herein and generally in the art, an AT 1406 can also be referred to as a user equipment (UE), a mobile terminal, and/or any other suitable nomenclature. In accordance with one aspect, system 1400 can provide service over a substantially large geographic region. For example, macro cells 1402a-1402g can provide coverage for a plurality of blocks in a neighborhood and/or another similarly suitable coverage area.

Figure 15:
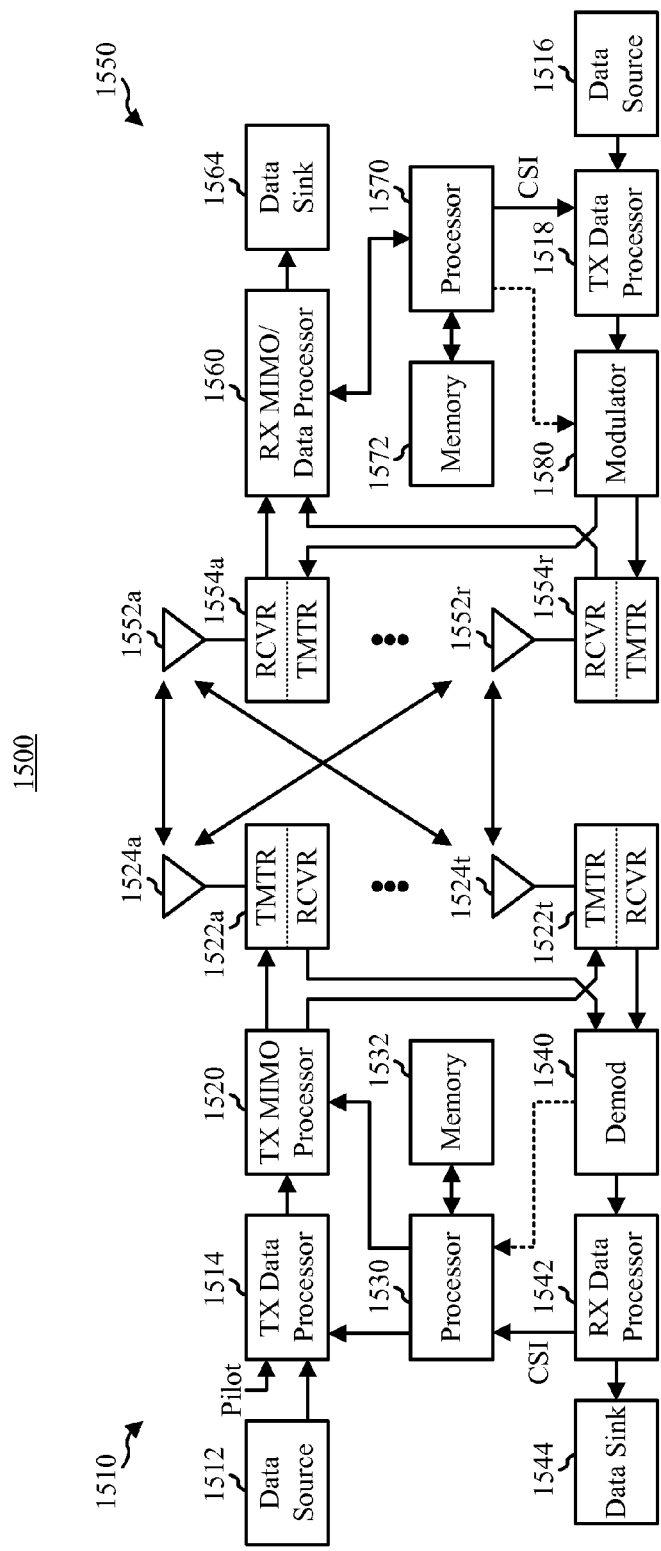
FIG. 15 is a block diagram illustrating an example wireless communication system in which various aspects described herein can function.

Referring now to FIG. 15, a block diagram illustrating an example wireless communication system 1500 in which various aspects described herein can function is provided. In one example, system 1500 is a multiple-input multiple-output (MIMO) system that includes a transmitter system 1510 and a receiver system 1550. It should be appreciated, however, that transmitter system 1510 and/or receiver system 1550 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1510 and/or receiver system 1550 described herein could be utilized in connection with a single output to single input antenna system.

In accordance with one aspect, traffic data for a number of data streams are provided at transmitter system 1510 from a data source 1512 to a transmit (TX) data processor 1514. In one example, each data stream can then be transmitted via a respective transmit antenna 1524. Additionally, TX data processor 1514 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1550 to estimate channel response. Back at transmitter system 1510, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1530.

Next, modulation symbols for all data streams can be provided to a TX processor 1520, which can further process the modulation symbols (e.g., for OFDM). TX MIMO processor 1520 can then provides $N_T$ modulation symbol streams to $N_T$ transceivers 1522a through 1522t. In one example, each transceiver 1522 can receive and process a respective symbol stream to provide one or more analog signals. Each transceiver 1522 can then further condition (e.g., amplify, filter, and upconvert) the analog signals to provide a modulated signal suitable for transmission over a MIMO channel. Accordingly, $N_T$ modulated signals from transceivers 1522a through 1522t can then be transmitted from $N_T$ antennas 1524a through 1524t, respectively.

In accordance with another aspect, the transmitted modulated signals can be received at receiver system 1550 by $N_R$ antennas 1552a through 1552r. The received signal from each antenna 1552 can then be provided to respective transceivers 1554. In one example, each transceiver 1554 can condition (e.g., filter, amplify, and downconvert) a respective received signal, digitize the conditioned signal to provide samples, and then processes the samples to provide a corresponding "received" symbol stream. An RX MIMO/data processor 1560 can then receive and process the $N_R$ received symbol streams from $N_R$ transceivers 1554 based on a particular receiver processing technique to provide $N_T$ "detected" symbol streams. In one example, each detected symbol stream can include symbols that are estimates of the modulation symbols transmitted for the corresponding data stream. RX processor 1560 can then process each symbol stream at least in part by demodulating, deinterleaving, and decoding each detected symbol stream to recover traffic data for a corresponding data stream. Thus, the processing by RX processor 1560 can be complementary to that performed by TX MIMO processor 1520 and TX data processor 1516 at transmitter system 1510. RX processor 1560 can additionally provide processed symbol streams to a data sink 1564.

In accordance with one aspect, the channel response estimate generated by RX processor 1560 can be used to perform space/time processing at the receiver, adjust power levels, change modulation rates or schemes, and/or other appropriate actions. Additionally, RX processor 1560 can further estimate channel characteristics such as, for example, signal-to-noise-and-interference ratios (SNRs) of the detected symbol streams. RX processor 1560 can then provide estimated channel characteristics to a processor 1570. In one example, RX processor 1560 and/or processor 1570 can further derive an estimate of the "operating" SNR for the system. Processor 1570 can then provide channel state information (CSI), which can comprise information regarding the communication link and/or the received data stream. This information can include, for example, the operating SNR. The CSI can then be processed by a TX data processor 1518, modulated by a modulator 1580, conditioned by transceivers 1554a through 1554r, and transmitted back to transmitter system 1510. In addition, a data source 1512 at receiver system 1550 can provide additional data to be processed by TX data processor 1518.

Back at transmitter system 1510, the modulated signals from receiver system 1550 can then be received by antennas 1524, conditioned by transceivers 1522, demodulated by a demodulator 1540, and processed by a RX data processor 1542 to recover the CSI reported by receiver system 1550. In one example, the reported CSI can then be provided to processor 1530 and used to determine data rates as well as coding and modulation schemes to be used for one or more data streams. The determined coding and modulation schemes can then be provided to transceivers 1522 for quantization and/or use in later transmissions to receiver system 1550. Additionally and/or alternatively, the reported CSI can be used by processor 1530 to generate various controls for TX data processor 1514 and TX MIMO processor 1520. In another example, CSI and/or other information processed by RX data processor 1542 can be provided to a data sink 1544.

In one example, processor 1530 at transmitter system 1510 and processor 1570 at receiver system 1550 direct operation at their respective systems. Additionally, memory 1532 at transmitter system 1510 and memory 1572 at receiver system 1550 can provide storage for program codes and data used by processors 1530 and 1570, respectively. Further, at receiver system 1550, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 16:
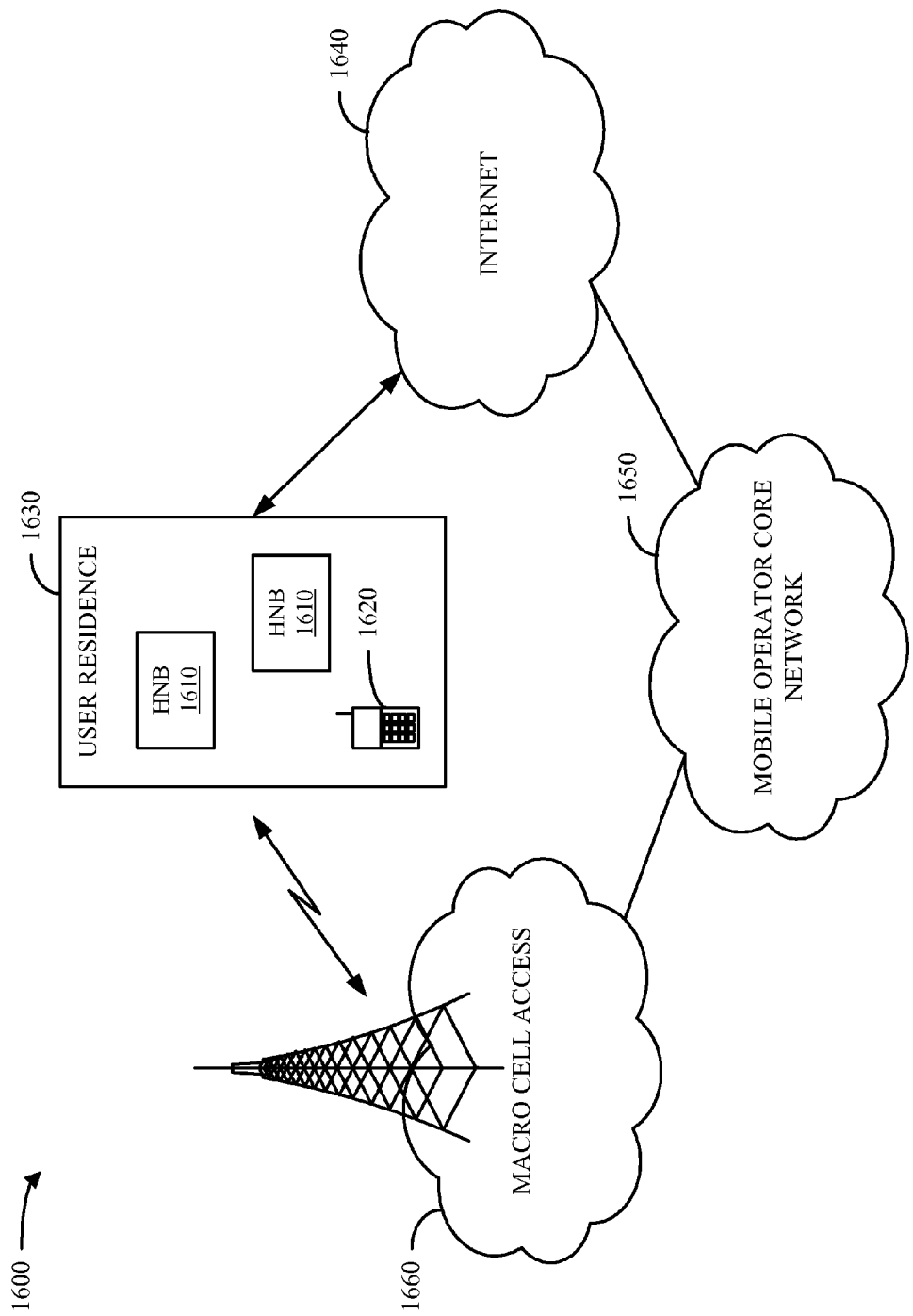
FIG. 16 illustrates an example communication system that enables deployment of access point base stations within a network environment.

FIG. 16 illustrates an example communication system 1600 that enables deployment of access point base stations within a network environment. As shown in FIG. 16, system 1600 can include multiple access point base stations (e.g., femto cells or Home Node B units (HNBs)) such as, for example, HNBs 1610. In one example, respective HNBs 1610 can be installed in a corresponding small scale network environment, such as, for example, one or more user residences 1630. Further, respective HNBs 1610 can be configured to serve associated and/or alien UE(s) 1620. In accordance with one aspect, respective HNBs 1610 can be coupled to the Internet 1640 and a mobile operator core network 1650 via a DSL router, a cable modem, and/or another suitable device (not shown). In accordance with one aspect, an owner of a femto cell or HNB 1610 can subscribe to mobile service, such as, for example, 3G/4G mobile service, offered through mobile operator core network 1650. Accordingly, UE 1620 can be enabled to operate both in a macro cellular environment 1660 and in a residential small scale network environment.

In one example, UE 1620 can be served by a set of Femto cells or HNBs 1610 (e.g., HNBs 1610 that reside within a corresponding user residence 1630) in addition to a macro cell mobile network 1660. As used herein and generally in the art, a home femto cell is a base station on which an AT or UE is authorized to operate on, a guest femto cell refers to a base station on which an AT or UE is temporarily authorized to operate on, and an alien femto cell is a base station on which the AT or UE is not authorized to operate on. In accordance with one aspect, a femto cell or HNB 1610 can be deployed on a single frequency or on multiple frequencies, which may overlap with respective macro cell frequencies.

It is to be understood that the aspects described herein can be implemented by hardware, software, firmware, middleware, microcode, or any combination thereof When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
    identifying one or more intra-node codebooks comprising a set of vector quantized entries relating to per-node channel conditions and one or more inter-node codebooks comprising a set of vector quantized entries relating to channel conditions between respective associated network nodes;
    selecting the one or more intra-node codebooks or inter-node codebooks from which to provide channel state feedback to an associated network node; and
    providing the channel state feedback to the associated network node corresponding to at least one selected codebook.

2. The method of claim 1, wherein the selecting comprises selecting the one or more intra-node codebooks or the one or more inter-node codebooks from which to provide the channel state feedback to the associated network node based at least in part on a downlink coordination strategy employed by the associated network node or a number of transmit antennas utilized by the associated network node.

3. The method of claim 2, wherein the selecting further comprises selecting the one or more intra-node codebooks upon determining that the associated network node employs coordinated downlink transmit interference nulling.

4. The method of claim 2, wherein the selecting further comprises selecting the one or more intra-node codebooks and the one or more inter-node codebooks upon determining that the associated network node employs joint downlink transmission.

5. The method of claim 2, wherein the selecting further comprises selecting the one or more inter-node codebooks upon determining that the associated network node utilizes a single transmit antenna.

6. The method of claim 1, wherein the selecting comprises selecting the one or more intra-node codebooks or the one or more inter-node codebooks from which to provide the channel state feedback to the associated network node based at least in part on information received from the associated network node.

7. The method of claim 1, wherein the one or more inter-node codebooks comprise respective entries relating to at least one of relative amplitude between channels corresponding to the respective associated network nodes or relative phase between channels corresponding to the respective associated network nodes.

8. The method of claim 1, wherein at least one intra-node codebook or inter-node codebook comprises respective entries relating to a partial channel description, the partial channel description comprising at least one type of information selected from the group consisting of eigen-component information, recommended beam information, and recommended beam matrix information.

9. The method of claim 1, wherein at least one intra-node codebook or inter-node codebook comprises respective entries relating to channel eigen-component information, the channel eigen-component information representing respective multi-in-multi-out (MIMO) channels between respective associated receive antennas and respective associated transmit antennas corresponding to the respective associated network nodes as equivalent multi-in-single-out (MISO) channels between the respective associated transmit antennas corresponding to the respective associated network nodes and a corresponding receive combiner output.

10. The method of claim 9, wherein the channel eigen-component information comprises at least one of intra-node components that correspond to the respective associated transmit antennas at the respective associated network nodes or at least one of inter-node components that correspond to at least one of relative amplitude or relative phase between the respective associated network nodes.

11. The method of claim 1, wherein respective intra-node codebooks and inter-node codebooks are constructed to match at least one of antenna configurations of the respective associated network nodes or standard observed propagation conditions.

12. The method of claim 1, wherein:
    the identifying comprises identifying respective resource units utilized by an associated communication system and identifying the one or more intra-node codebooks and the one or more inter-node codebooks that comprise respective entries constructed on a per-resource unit basis; and
    the providing comprises providing the channel state feedback to the associated network node corresponding to one or more entries in the at least one selected codebook that correspond to the respective resource units to be utilized by the associated network node.

13. The method of claim 12, wherein the respective resource units comprise at least one of resource blocks or frequency sub-bands.

14. The method of claim 1, wherein the providing comprises providing the channel state feedback to the associated network node at least in part by transmitting one or more precoding indices to the associated network node that correspond to respective entries in the at least one selected codebook that substantially match measured channel conditions.

15. A wireless communications apparatus, comprising:
    a memory that stores data relating to one or more intra-node codebooks comprising a set of vector quantized entries relating to per-node channel conditions and one or more inter-node codebooks comprising a set of vector quantized entries relating to channel conditions between respective associated network nodes; and
    a processor configured to select the one or more intra-node codebooks or inter-node codebooks from which to provide channel state feedback to an associated network node and to provide the channel state feedback to the associated network node corresponding to at least one selected codebook.

16. The wireless communications apparatus of claim 15, wherein the processor is further configured to select the one or more intra-node codebooks or inter-node codebooks from which to provide the channel state feedback to the associated network node based at least in part on a downlink coordination strategy employed by the associated network node.

17. The wireless communications apparatus of claim 16, wherein the processor is further configured to select one or more intra-node codebooks upon determining that the associated network node employs coordinated downlink transmit interference nulling.

18. The wireless communications apparatus of claim 16, wherein the processor is further configured to select the one or more intra-node codebooks and the one or more inter-node codebooks upon determining that the associated network node employs joint downlink transmission.

19. The wireless communications apparatus of claim 15, wherein the processor is further configured to select the one or more intra-node codebooks or inter-node codebooks from which to provide the channel state feedback to a respective one of the associated network nodes based at least in part on information received from the respective one of the associated network nodes.

20. The wireless communications apparatus of claim 15, wherein the one or more inter-node codebooks comprise respective entries relating to at least one of relative amplitude between channels corresponding to the respective associated network nodes or relative phase between channels corresponding to the respective associated network nodes.

21. The wireless communications apparatus of claim 15, wherein at least one intra-node codebook or inter-node codebook comprises respective entries relating to a partial channel description, the partial channel description comprising at least one type of information selected from the group consisting of eigen-component information, recommended beam information, and recommended beam matrix information.

22. The wireless communications apparatus of claim 15, wherein at least one intra-node codebook or inter-node codebook comprises respective entries relating to channel eigen-component information, the channel eigen-component information representing respective multi-in-multi-out (MIMO) channels between respective receive antennas at the wireless communications apparatus and respective transmit antennas at corresponding associated network nodes as equivalent multi-in-single-out (MISO) channels between the respective transmit antennas at the corresponding associated network nodes and an output of a receive combiner associated with the wireless communications apparatus.

23. The wireless communications apparatus of claim 22, wherein the channel eigen-component information comprises at least one of intra-node components that correspond to the respective transmit antennas at the respective associated network nodes or inter-node components that correspond to at least one of relative amplitude or relative phase between the respective associated network nodes.

24. The wireless communications apparatus of claim 15, wherein:
the memory further stores the data relating to respective resource units utilized by the associated network node for communication to the wireless communications apparatus on a downlink to the wireless communications apparatus;
the one or more intra-node codebooks and the one or more inter-node codebooks comprise respective entries constructed on a per-resource unit basis; and
the processor is further configured to provide the channel state feedback to the associated network node corresponding to one or more entries in the at least one selected codebook that correspond to respective resource units to be utilized by the associated network node.

25. The wireless communications apparatus of claim 15, wherein the processor is further configured to provide the channel state feedback to the associated network node at least in part by transmitting one or more precoding indices to the associated network node that correspond to respective entries in the at least one selected codebook that substantially match measured channel conditions.

26. An apparatus, comprising:
means for identifying one or more per-node channel state information (CSI) codebooks and one or more inter-node CSI codebooks constructed via vector quantization;
means for selecting a per-node CSI codebook, an inter-node CSI codebook, or both the per-node CSI codebook and the inter-node CSI codebook from which channel state feedback is to be provided to one or more serving network nodes of a network having a plurality of network nodes; and
means for providing the channel state feedback to the one or more serving network nodes based on one or more selected CSI codebooks.

27. The apparatus of claim 26, wherein the means for selecting comprises means for selecting the per-node CSI codebook, the inter-node CSI codebook, or both the per-node and inter-node CSI codebooks based at least in part on a downlink coordination strategy employed by the one or more serving network nodes.

28. The apparatus of claim 27, wherein the means for selecting further comprises means for selecting the per-node CSI codebook upon determining that the one or more serving network nodes employ coordinated beamforming.

29. The apparatus of claim 27, wherein the means for selecting further comprises means for selecting the per-node CSI codebook and the inter-node CSI codebook upon determining that the one or more serving network nodes employ joint transmission.

30. The apparatus of claim 26, wherein the means for selecting comprises means for selecting the per-node CSI codebook, the inter-node CSI codebook, or both the per-node CSI codebook and the inter-node CSI codebook based at least in part on information received from the one or more serving network nodes.

31. The apparatus of claim 26, wherein the one or more inter-node CSI codebooks comprise respective entries relating to at least one of relative amplitude between channels corresponding to respective network nodes of the network or relative phase between channels corresponding to the respective network nodes of the network.

32. The apparatus of claim 26, wherein at least one per-node CSI codebook or inter-node CSI codebook comprises respective entries relating to a partial channel description, the partial channel description comprising at least one type of information selected from the group consisting of eigen-component information, recommended beam information, and recommended beam matrix information.

33. The apparatus of claim 26, wherein at least one per-node CSI codebook or inter-node CSI codebook comprises respective entries relating to channel eigen-component information, the channel eigen-component information representing respective multi-in-multi-out (MIMO) channels between respective associated receive antennas and respective associated transmit antennas at respective network nodes of the network as equivalent multi-in-single-out (MISO) channels between the respective associated transmit antennas at respective network nodes of the network and a corresponding receive combiner output.

34. The apparatus of claim 33, wherein the channel eigen-component information comprises at least one of per-node components that correspond to the respective associated transmit antennas at the respective network nodes of the network or inter-node components that correspond to at least one of relative amplitude or relative phase between the respective network nodes of the network.

35. The apparatus of claim 26, wherein:
the means for identifying comprises means for identifying respective resource units utilized by an associated communication system and means for identifying the one or more per-node CSI codebooks and the one or more inter-node CSI codebooks that comprise respective entries constructed on a per-resource unit basis; and
the means for providing comprises means for providing the channel state feedback to the one or more serving network nodes corresponding to one or more entries in the one or more respective selected CSI codebooks that correspond to the respective resource units to be utilized by the one or more serving network nodes.

36. The apparatus of claim 35, wherein the respective resource units comprise at least one of resource blocks or frequency sub-bands.

37. A computer program product, comprising:
a non-transitory computer-readable medium, comprising:
code for causing a computer to identify one or more per-node channel state information (CSI) codebooks and one or more inter-node CSI codebooks constructed via vector quantization;
code for causing the computer to select a per-node CSI codebook, an inter-node CSI codebook, or both the per-node CSI codebook and the inter-node CSI codebook from which channel state feedback is to be provided to one or more serving network nodes of a network including a plurality of network nodes; and
code for causing the computer to provide the channel state feedback to the one or more serving network nodes based on one or more selected CSI codebooks.

38. The computer program product of claim 37, wherein the code for causing the computer to select comprises code for causing the computer to select the per-node CSI codebook, the inter-node CSI codebook, or both the per-node CSI codebook and the inter-node CSI codebook based at least in part on a downlink coordination strategy employed by the one or more serving network nodes.

39. The computer program product of claim 37, wherein the code for causing the computer to select comprises code for causing the computer to select the per-node CSI codebook, the inter-node CSI codebook, or both the per-node and inter-node CSI codebooks based at least in part on information received from the one or more serving network nodes.

40. The computer program product of claim 37, wherein the one or more inter-node CSI codebooks comprise respective entries relating to at least one of relative amplitude between channels corresponding to respective network nodes of the network or relative phase between channels corresponding to the respective network nodes of the network.

41. The computer program product of claim 37, wherein:
the code for causing the computer to identify comprises code for causing the computer to identify respective resource units utilized by an associated communication system and code for causing the computer to identify the one or more per-node CSI codebooks and the one or more inter-node CSI codebooks that comprise respective entries constructed on a per-resource unit basis; and
the code for causing the computer to provide comprises code for causing the computer to provide the channel state feedback to the one or more serving network nodes corresponding to one or more entries in the one or more respective selected CSI codebooks that correspond to the respective resource units to be utilized by the one or more serving network nodes.

42. The computer program product of claim 41, wherein the respective resource units comprise at least one of resource blocks or frequency sub-bands.

43. A non-transitory computer-readable medium having stored thereon instructions that, if executed by a processor, cause the processor to execute a method comprising:
identifying one or more intra-node codebooks comprising a set of vector quantized entries relating to per-node channel conditions and one or more inter-node codebooks comprising a set of vector quantized entries relating to channel conditions between respective associated network nodes;
selecting the one or more intra-node codebooks or inter-node codebooks from which to provide channel state feedback to an associated network node; and
providing the channel state feedback to the associated network node corresponding to at least one selected codebook.

44. The medium of claim 43, wherein the selecting comprises selecting the one or more intra-node codebooks or the one or more inter-node codebooks from which to provide the channel state feedback to the associated network node based at least in part on a downlink coordination strategy employed by the associated network node or a number of transmit antennas utilized by the associated network node.

45. The medium of claim 44, wherein the selecting further comprises selecting the one or more intra-node codebooks upon determining that the associated network node employs coordinated downlink transmit interference nulling.

46. The medium of claim 44, wherein the selecting further comprises selecting the one or more intra-node codebooks and the one or more inter-node codebooks upon determining that the associated network node employs joint downlink transmission.

47. The medium of claim 44, wherein the selecting further comprises selecting the one or more inter-node codebooks upon determining that the associated network node utilizes a single transmit antenna.

48. The medium of claim 43, wherein the selecting comprises selecting the one or more intra-node codebooks or the one or more inter-node codebooks from which to provide the channel state feedback to the associated network node based at least in part on information received from the associated network node.

49. The medium of claim 43, wherein the one or more inter-node codebooks comprise respective entries relating to at least one of relative amplitude between channels corresponding to the respective associated network nodes or relative phase between channels corresponding to the respective associated network nodes.

50. The medium of claim 43, wherein at least one intra-node codebook or inter-node codebook comprises respective entries relating to a partial channel description, the partial channel description comprising at least one type of information selected from the group consisting of eigen-component information, recommended beam information, and recommended beam matrix information.

51. The medium of claim 43, wherein at least one intra-node codebook or inter-node codebook comprises respective entries relating to channel eigen-component information, the channel eigen-component information representing respective multi-in-multi-out (MIMO) channels between respective associated receive antennas and respective associated transmit antennas corresponding to the respective associated network nodes as equivalent multi-in-single-out (MISO) channels between the respective associated transmit antennas corresponding to the respective associated network nodes and a corresponding receive combiner output.

52. The medium of claim 51, wherein the channel eigen-component information comprises at least one of intra-node components that correspond to the respective associated transmit antennas at the respective associated network nodes or at least one of inter-node components that correspond to at least one of relative amplitude or relative phase between the respective associated network nodes.

53. The medium of claim 43, wherein respective intra-node codebooks and inter-node codebooks are constructed to match at least one of antenna configurations of the respective associated network nodes or standard observed propagation conditions.

54. The medium of claim 43, wherein:
the identifying comprises identifying respective resource units utilized by an associated communication system and identifying the one or more intra-node codebooks and the one or more inter-node codebooks that comprise respective entries constructed on a per-resource unit basis; and
the providing comprises providing the channel state feedback to the associated network node corresponding to one or more entries in the at least one selected codebook that correspond to the respective resource units to be utilized by the associated network node.

55. The medium of claim 54, wherein the respective resource units comprise at least one of resource blocks or frequency sub-bands.

56. The medium of claim 43, wherein the providing comprises providing the channel state feedback to the associated network node at least in part by transmitting one or more precoding indices to the associated network node that correspond to respective entries in the at least one selected codebook that substantially match measured channel conditions.

57. A method, comprising:
identifying, by a communication device, one or more per-node channel state information (CSI) codebooks and one or more inter-node CSI codebooks constructed via vector quantization;
selecting, by the communication device, a per-node CSI codebook, an inter-node CSI codebook, or both per-node and inter-node CSI codebooks from which channel state feedback is to be provided to one or more serving network nodes of a network including a plurality of network nodes; and
providing the channel state feedback to the one or more serving network nodes based on one or more selected CSI codebooks.

58. The method of claim 57, wherein said selecting comprises selecting the per-node CSI codebook, the inter-node CSI codebook, or both the per-node and inter-node CSI codebooks based at least in part on a downlink coordination strategy employed by the one or more serving network nodes.

59. The method of claim 57, wherein said selecting comprises selecting the per-node CSI codebook, the inter-node CSI codebook, or both the per-node and inter-node CSI codebooks based at least in part on information received from the one or more serving network nodes.

60. The method of claim 57, wherein the one or more inter-node CSI codebooks comprise respective entries relating to at least one of relative amplitude between channels corresponding to respective network nodes of the network or relative phase between channels corresponding to the respective network nodes of the network.

61. The method of claim 57, wherein:
said identifying comprises identifying respective resource units utilized by an associated communication system and identifying the one or more per-node CSI codebooks and the one or more inter-node CSI codebooks that comprise respective entries constructed on a per-resource unit basis; and
said providing comprises providing the channel state feedback to the one or more serving network nodes corresponding to one or more entries in the one or more respective selected CSI codebooks that correspond to the respective resource units to be utilized by the one or more serving network nodes.

62. The method of claim 61, wherein the respective resource units comprise at least one of resource blocks or frequency sub-bands.

* * * * *